United States Patent
Masuda et al.

(10) Patent No.: US 9,705,772 B2
(45) Date of Patent: Jul. 11, 2017

(54) IDENTIFICATION APPARATUS, IDENTIFICATION METHOD AND IDENTIFICATION PROGRAM

(71) Applicant: Hitachi, Ltd., Tokyo (JP)

(72) Inventors: Mineyoshi Masuda, Tokyo (JP); Kiyomi Wada, Tokyo (JP); Jun Mizuno, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 178 days.

(21) Appl. No.: 14/427,954

(22) PCT Filed: Apr. 26, 2013

(86) PCT No.: PCT/JP2013/062471
§ 371 (c)(1),
(2) Date: Mar. 12, 2015

(87) PCT Pub. No.: WO2014/174681
PCT Pub. Date: Oct. 30, 2014

(65) Prior Publication Data
US 2015/0222514 A1 Aug. 6, 2015

(51) Int. Cl.
*G06F 15/173* (2006.01)
*H04L 12/26* (2006.01)
(Continued)

(52) U.S. Cl.
CPC ........ *H04L 43/0876* (2013.01); *G06F 11/079* (2013.01); *G06F 11/0709* (2013.01);
(Continued)

(58) Field of Classification Search
CPC .......... H04L 11/34; H04L 67/02; H04L 67/34
(Continued)

(56) References Cited

U.S. PATENT DOCUMENTS

2005/0289231 A1* 12/2005 Harada ................. G06Q 10/00
709/224
2010/0153783 A1 6/2010 Yokoyama
(Continued)

FOREIGN PATENT DOCUMENTS

JP 2006-011683 A 1/2006
JP 2010-176609 A 8/2010
(Continued)

*Primary Examiner* — Wing F Chan
*Assistant Examiner* — Andrew Woo
(74) *Attorney, Agent, or Firm* — Volpe and Koenig, P.C.

(57) ABSTRACT

It is provided an identification apparatus is configured to: obtain, from a first request group, same-type requests which are of the same type as an investigation subject request in a first request group; obtain, other-type requests that have been transmitted from a first apparatus to a second apparatus and a response to which has been transmitted from the second apparatus to the first apparatus, during a processing period; generate, for the investigation subject request and each of the same-type requests; search the generated sets for sets that have the matching other-type requests, and remove one of the found sets; obtain second requests that have been processed by the second apparatus during the processing period from the second request group; calculate, for the investigation subject request and each of the same-type requests after the removal, values of correlation with the obtained second requests.

7 Claims, 19 Drawing Sheets

(51) Int. Cl.
*H04L 29/08* (2006.01)
*G06F 11/34* (2006.01)
*G06F 11/07* (2006.01)
*H04L 12/24* (2006.01)

(52) U.S. Cl.
CPC ...... *G06F 11/3419* (2013.01); *G06F 11/3452* (2013.01); *H04L 67/02* (2013.01); *H04L 67/32* (2013.01); *G06F 2201/81* (2013.01); *G06F 2201/835* (2013.01); *G06F 2201/875* (2013.01); *H04L 41/0631* (2013.01); *H04L 43/0852* (2013.01)

(58) Field of Classification Search
USPC .......................................................... 709/224
See application file for complete search history.

(56) References Cited

U.S. PATENT DOCUMENTS

2010/0198912 A1    8/2010  Kawaba et al.
2011/0307602 A1*  12/2011  Kanemasa .......... G06F 11/3419
                                                   709/224
2012/0246300 A1    9/2012  Kubota et al.

FOREIGN PATENT DOCUMENTS

JP        2012-198818 A    10/2012
WO      2009-025039 A1    2/2009

* cited by examiner

| HTTP REQUEST IDENTIFIER 21 | PROCESSING-HOST-BY-PROCESSING-HOST-BASIS SIMULTANEOUSLY EXECUTED HTTP REQUEST COUNT 22 | PROCESSING HOST 23 | HTTP REQUEST TYPE IDENTIFIER 24 | START TIME 25 | END TIME 26 | OVER THRESHOLD 27 | |
|---|---|---|---|---|---|---|---|
| 401 | 1 | Host#1 | H1 | 04:00:00.000 | 04:00:10.000 | Y | 28a |
| 402 | 1 | Host#2 | H2 | 04:00:00.000 | 04:00:05.000 | N | 28b |
| .. | .. | .. | .. | .. | .. | .. | |
| 300 | 2 | Host#1 | H1 | 03:00:00.000 | 03:00:05.000 | N | 28c |
| 301 | 2 | Host#1 | H2 | 03:00:00.000 | 03:00:05.000 | N | 28d |
| .. | .. | .. | .. | .. | .. | .. | |
| 200 | 4 | Host#1 | H1 | 02:00:00.000 | 02:00:05.000 | N | 28e |
| 201 | 4 | Host#1 | H3 | 02:00:00.000 | 02:00:05.000 | N | 28f |
| 202 | 4 | Host#1 | H4 | 02:00:00.000 | 02:00:05.000 | N | 28g |
| 203 | 4 | Host#1 | H5 | 02:00:00.000 | 02:00:05.000 | N | 28h |
| .. | .. | .. | .. | .. | .. | .. | |
| 100 | 2 | Host#1 | H1 | 01:00:00.000 | 01:00:05.000 | N | 28i |
| 101 | 2 | Host#1 | H2 | 01:00:00.000 | 01:00:05.000 | N | 28j |
| .. | .. | .. | .. | .. | .. | .. | |
| 11 | 2 | Host#1 | H1 | 00:00:00.000 | 00:00:05.000 | N | 28k |
| 10 | 2 | Host#1 | H6 | 00:00:00.000 | 00:00:05.000 | N | 28l |
| .. | .. | .. | .. | .. | .. | .. | |

*Fig. 3*

| | SQL IDENTIFIER (31) | START TIME (32) | END TIME (33) | REQUESTOR HOST (34) | TRANSACTION ID (35) | CPU TIME (ms) (36) | I/O WAITING TIME (ms) (37) | LOCK WAITING TIME (ms) (38) |
|---|---|---|---|---|---|---|---|---|
| 39a | S1 | 00:00:01.000 | 00:00:03.000 | Host#1 | T1 | 1,000 | 1,000 | 1,000 |
| 39b | S10 | 00:00:01.000 | 00:00:03.000 | Host#2 | T2 | 1,000 | 1,000 | 1,000 |
|  | .. | .. | .. | .. | .. | .. | .. | .. |
| 39c | S1 | 01:00:01.000 | 01:00:03.000 | Host#1 | T3 | 1,000 | 1,000 | 1,000 |
| 39d | S2 | 01:00:01.000 | 01:00:03.000 | Host#1 | T4 | 1,000 | 1,000 | 1,000 |
|  | .. | .. | .. | .. | .. | .. | .. | .. |
| 39e | S1 | 02:00:01.000 | 02:00:03.000 | Host#1 | T5 | 1,000 | 1,000 | 1,000 |
| 39f | S3 | 02:00:01.000 | 02:00:03.000 | Host#1 | T6 | 2,000 | 1,000 | 0 |
| 39g | S4 | 02:00:01.000 | 02:00:03.000 | Host#1 | T7 | 100 | 100 | 2,800 |
| 39h | S5 | 02:00:01.000 | 02:00:03.000 | Host#1 | T8 | 100 | 100 | 2,800 |
|  | .. | .. | .. | .. | .. | .. | .. | .. |
| 39i | S1 | 03:00:01.000 | 03:00:03.000 | Host#1 | T9 | 2,000 | 1,000 | 0 |
| 39j | S2 | 03:00:01.000 | 03:00:03.000 | Host#1 | T10 | 1,000 | 1,000 | 1,000 |
|  | .. | .. | .. | .. | .. | .. | .. | .. |
| 39k | S1 | 04:00:01.000 | 04:00:03.000 | Host#1 | T11 | 2,000 | 1,000 | 0 |
| 39l | S6 | 04:00:01.000 | 04:00:03.000 | Host#1 | T12 | 1,000 | 1,000 | 1,000 |
|  | .. | .. | .. | .. | .. | .. | .. | .. |

Fig. 4

| SYSTEM | MONITORING SUBJECT | MONITORING PROPERTIES : VALUES | |
|---|---|---|---|
| SYSTEM A | HTTP REQUEST | MONITORING INTERVAL : REAL TIME | 44a |
| | | MONITORING SUBJECT : ALL HTTP REQUESTS | 44b |
| | DBMS | MONITORING INTERVAL : 1 SECOND | 44c |
| | | MONITORING SUBJECT : ALL SQL STATEMENTS OBSERVED | 44d |
| : | : | : | |

HTTP REQUEST DELAY INVESTIGATION

SELECT HTTP REQUEST

| | HTTP REQUEST | WHEN | RESPONSE TIME (sec) |
|---|---|---|---|
| ☐ | H1 | 2013/01/014:00:00.000 | 10.0 |
| ☑ | H100 | 2013/01/015:00:00.000 | 4.0 |
| ☐ | H200 | 2013/01/016:00:00.000 | 6.0 |

CANDIDATE SQL

| SQL | WHEN | DURATION (ms) | CPU TIME(ms) | I/O TIME(ms) | WAIT TIME(ms) | RATING |
|---|---|---|---|---|---|---|
| S1 | 2013/01/014:00:01.000 | 3,000 | 1,000 | 1,000 | 1,000 | ★★★★ |
| S8 | 2013/01/014:00:03.000 | 300 | 200 | 100 | 0 | ★ |
| S9 | 2013/01/014:00:03.300 | 400 | 200 | 200 | 0 | ★ |
| S2 | 2013/01/014:00:01.000 | 2,000 | 500 | 1,500 | 0 | - |
| S3 | 2013/01/014:00:01.000 | 1,500 | 1,000 | 0 | 500 | - |

| HTTP REQUEST TYPE IDENTIFIER (51) | HTTP REQUEST IDENTIFIER (52) | PROCESSING-HOST-BY-PROCESSING-HOST-BASIS SIMULTANEOUSLY EXECUTED HTTP REQUEST COUNT (53) | DISTURBANCE HTTP REQUEST TYPE (54) | |
|---|---|---|---|---|
| H1 | 1 | 1 | (null) | 55a |
| | 100 | 2 | (H2) | 55b |
| | 101 | 2 | (H3) | 55c |
| | 200 | 3 | (H4, H5) | 55d |
| | 301 | 3 | (H6, H7) | 55e |
| | : | : | : | |
| H2 | 500 | 1 | (null) | 55f |
| : | : | : | : | |

Fig. 11A (B)

| HTTP REQUEST TYPE IDENTIFIER (61) | SQL IDENTIFIER (62) | APPEARANCE COUNT (63) | |
|---|---|---|---|
| H1 | S1 | 30 | 64a |
| | S2 | 3 | 64b |
| | S3 | 6 | 64c |
| | : | : | |
| H2 | S2 | 16 | |
| | : | : | 64d |

Fig. 11B

IDENTIFICATION APPARATUS, IDENTIFICATION METHOD AND IDENTIFICATION PROGRAM

BACKGROUND OF THE INVENTION

This invention relates to an identification apparatus, identification method, and identification program for identifying candidates for the cause of a performance failure in a computer system.

Performance management of a computer system is one of important roles of an operation department. The operation department (A) detects performance deterioration in a service that the computer system provides to end users, and (B) identifies and deals with the cause of the deterioration.

Technologies with which (A) is accomplished include end user monitoring. This technology involves monitoring processing requests that are issued by end users to the computer system and detecting a delay in the fulfillment of the processing requests. In the case where the computer system is a Web system, packets of HTTP requests sent from end users to the computer system are monitored, and a response time is calculated from a time difference between a processing request packet and its response packet in order to detect whether or not there is a delay.

The work of identifying the cause of a performance failure in (B) is in most cases performed on databases which are particularly prone to a performance failure. The computer system's operation administrator monitors processing requests (SQL statements) sent to a database, and identifies an SQL statement that is suspected to be the cause of a performance failure from records about the execution time of the monitored SQL statements.

The HTTP request monitoring of (A) and the SQL statement monitoring of (B) are conducted separately and therefore cannot be associated with each other. Consequently, a delay in the processing of HTTP requests that is detected in (A) does not lead to efficient identification of an SQL statement that has caused the delay.

An analysis apparatus of JP 2012-198818 A, on the other hand, calculates the probability of a second pair existing between a request and a response that constitute a first pair to extract a second pair that is associated with a given first pair based on the calculated probability. In other words, this analysis apparatus extracts a second pair that corresponds to a given first pair based on probability, without using a model that defines associated pieces of information in advance. Accordingly, when a change in system specifications or the like creates a new association between a first pair and a second pair, the analysis apparatus associates the new first pair and second pair with each other.

In JP 2012-198818 A, the probability of an HTTP request and an SQL statement that are observed independently of each other being observed in the same period (i.e., correlation) is calculated in this manner. When the probability of a particular SQL statement appearing in the processing period of an HTTP request is high, a correlation between the HTTP request and the SQL statement is acknowledged.

Records of HTTP requests and SQL statements, which are processed at a rate of several tens to several hundreds per second in some cases, amount to a huge size. Calculating the probability for every possible pairing of an HTTP request and an SQL statement therefore requires reading a great amount of data and a tremendous amount of calculation. A problem of executing this calculation in a realistic time frame is an increase in calculation load. The problem is not limited to the relation between an HTTP request and an SQL statement, and arises between any pieces of data that are observed independently of one another.

SUMMARY OF THE INVENTION

It is an object of this invention to reduce the amount of calculation for obtaining an association relation between a plurality of pieces of data that are observed independently of one another.

An aspect of the invention disclosed in this application is an identification apparatus to be coupled to a first apparatus and a second apparatus, comprising: a processor configured to execute programs; a memory configured to store the programs executed by the processor; and an interface configured to control communication between the identification apparatus and the first apparatus and communication between the identification apparatus and the second apparatus, wherein the memory stores a first request group, which is a group of first requests received by the first apparatus, and a second request group, which is a group of second requests processed by the second apparatus in response to a request from the first apparatus, and wherein the processor is configured to: obtain, from the first request group, same-type requests which are of the Same type as an investigation subject request in the first request group; obtain, for the investigation subject request and each of the same-type requests, from among other-type requests in the first request group which are of different types from the investigation subject request, other-type requests that have been transmitted from the first apparatus to the second apparatus and a response to which has been transmitted from the second apparatus to the first apparatus during a processing period of one of the investigation subject request and the each of the same-type requests which starts with the transmission of the one of the investigation subject request and the each of the same-type requests from the first apparatus to the second apparatus and ends with the transmission of a response to the one of the investigation subject request and the each of the same-type requests from the second apparatus to the first apparatus; generate, for the investigation subject request and each of the same-type requests, sets in which one of the investigation subject request and the each of the same-type requests is combined with the obtained other-type requests; search the generated sets for sets that have the matching other-type requests, and remove one of the found sets; obtain, for the investigation subject request and each of the same-type requests after the removal, the second requests that have been processed by the second apparatus during the processing period from the second request group; calculate, for the investigation subject request and each of the same-type requests after the removal, values of correlation with the obtained second requests; and output a result of the calculation.

According to the exemplary embodiment mode of this invention, the amount of calculation for obtaining an association relation, between a plurality of pieces of data that are observed independently of one another is reduced. Other objects, configurations, and effects than those described above are clarified by the following description of an embodiment.

BRIEF DESCRIPTION OF THE DRAWINGS

FIG. 3 is an explanatory diagram showing an example of data that is stored in the HTTP monitoring data table of FIG. 1.

FIG. 4 is an explanatory diagram showing an example of data that is stored in the SQL monitoring data table.

FIG. 7 is an explanatory diagram illustrating an example of a screen that is displayed on the display apparatus by the SQL statement identifying program.

FIG. 11A is an explanatory diagram each showing an example of data stored in a table that is used in the network system according to the second embodiment.

FIG. 11B is an explanatory diagram each showing an example of data stored in a table that is used in the network system according to the second embodiment.

DETAILED DESCRIPTION OF THE PREFERRED EMBODIMENTS

Figure 1:
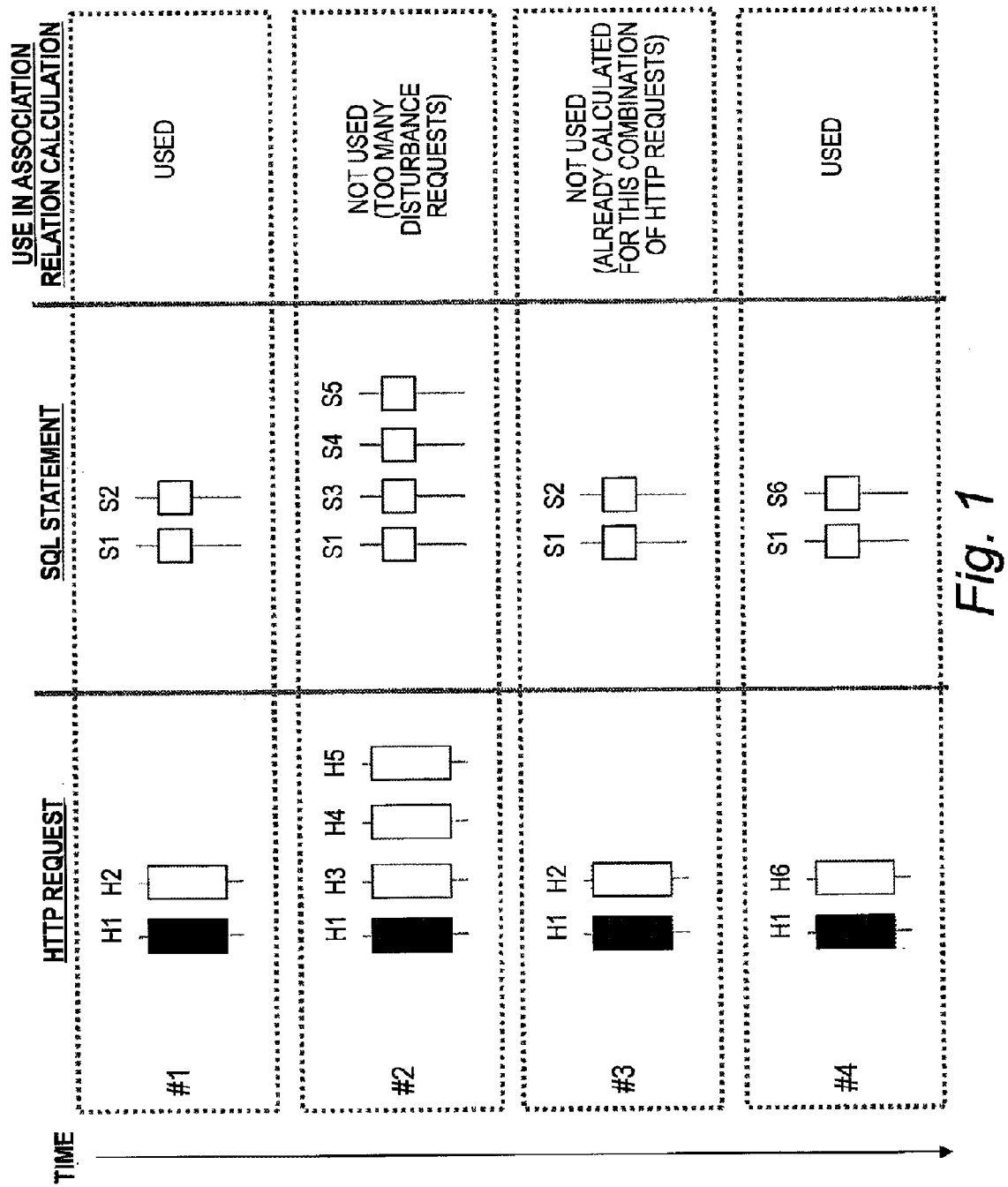
FIG. 1 is an explanatory diagram illustrating an example of identifying candidates for the cause of a performance failure in the embodiment mode of this invention.

In the following description, although pieces of information of this invention are described by using such expressions as "aaa table", "aaa list", "aaa DB", and "aaa queue", those pieces of information may be expressed by data structures other than a table, a list, a DB, a queue, and the like. Therefore, "aaa table", "aaa list", "aaa DB", "aaa queue", and the like are sometimes referred to as "aaa information" in order to show that those pieces of information are independent of their data structures.

In addition, although such expressions as "identification information", "identifier", "name", "ID" are used in order to describe details of each piece of information, those expressions are interchangeable.

In the following description, although a description is given by using "program" as a subject in some cases, the program is executed by a processor to perform defined processing while using a memory and a communication port (communication control device). Therefore, the description given by using "program" as a subject may also be interpreted as a description given by using "processor" as a subject. Further, processing disclosed while a program is used as a subject may also be interpreted as processing performed by a computer such as a management server or an information processing apparatus. Further, a part or all of a program may also be implemented by dedicated hardware.

Further, various programs may also be installed onto each computer by a program distribution server or computer-readable memory media. The program distribution server in this case includes a processor and storage resources, and the storage resources store a distributing program and programs to be distributed. The processor of the program distribution server executes the distributing program, thereby distributing to other computers the programs to be distributed.

It should be noted that a monitoring computer according to an embodiment mode of this invention includes input/output devices. As examples of the input/output devices, a display, a keyboard, and a pointer device are conceivable, but the input/output devices may be other devices. Moreover, a serial interface or an Ethernet interface may be used as an input/output device as an alternative to the input/output devices, and input and display on the input/output devices may be substituted by coupling, to the interface, a computer for display including a display, a keyboard, or a pointer device, transmitting information for display to the computer for display, and receiving information for input from the computer for display, thereby performing display on the computer for display and receiving the input from the computer for display.

A set of at least one computer for monitoring a computer system that is a subject of monitoring and displaying information for display of the invention of this application is hereinafter sometimes referred to as "monitoring system". In a case where the monitoring computer displays the information for display, the monitoring computer is the monitoring system. Further, a combination of the monitoring computer and the computer for display is also the monitoring system. Further, processing equivalent to that of the monitoring computer may also be implemented by a plurality of computers in order to sped up monitoring processing and achieve a higher reliability, and in this case, the plurality of computers (including the computer for display in a case where the computer for display performs display) are the monitoring system.

An identification apparatus, identification method, and identification program according to the embodiment mode of this invention for identifying candidates for the cause of a performance failure are described.

In this embodiment mode, an association between a Hypertext Transfer Protocol (HTTP) request which is an example of a first request and a Structured Query Language (SQL) statement which is an example of a second request is obtained with precision and with less calculation, and SQL statements that are candidates for the cause of a delay in the processing of an HTTP request are identified efficiently with the HTTP request as a starting point. Specifically, instead of calculating a correlation for every possible pairing of an HTTP request and an SQL statement as in the method of related art which has been described in the "BACKGROUND OF THE INVENTION" section, this embodiment mode limits the calculation to a partial period to reduce the amount of calculation significantly.

<Example of Identifying Candidates for the Cause of a Performance Failure>

FIG. 1 is an explanatory diagram illustrating an example of identifying candidates for the cause of a performance failure in the embodiment mode of this invention. In FIG. 1, the vertical line on the left end is a time axis that indicates time progressing from the top downward. The left column indicates HTTP requests observed in a period, the middle column indicates SQL statements observed in the same period as that of the left column, and the right column indicates whether or not the period of the left column and the right column is used in the correlation calculation.

A cell "#1" in the left column indicates "a period". Illustrated in FIG. 1 are four periods, specifically, periods "#1", "#2", "#3", and "#4". A description on notation which takes the period "#1" as an example applies to the rest of the periods, "#2", "#3", and "#4", as well.

The cell #1 in the left column indicates that two HTTP requests, specifically, a type H1 HTTP request and a type H2 HTTP request, have been processed in parallel in the period #1, "H1" and "H2" are symbols that are a simplified expression of information for identifying the type of an HTTP request, namely, the Uniform Resource Locator (URL) or similar identification information. In the example of FIG. 1, the HTTP request H1 which is represented by a rectangle of a deep color has a delay (performance failure) in processing.

Hereinafter, an HTTP request of which processing has been delayed and for which the cause of the performance failure is to be identified (here, H1) is referred to as target HTTP request, and other HTTP requests (here, H2, H3 . . . ) are referred to as disturbance HTTP requests.

The middle column indicates that, similarly to the HTTP monitoring data described above, two SQL statements, specifically, a type S1 SQL statement and a type S2 SQL statement, have been processed in parallel in the period #1, "S1" is a type of SQL statement that is processed in a database management system (DBMS) during the processing of the HTTP request H1. The same relation is found between H2 and S2.

An association relation in terms of processing thus exists between an HTTP request and an SQL statement. However, information that links an HTTP request and an SQL statement cannot generally be obtained when HTTP requests and SQL statements are observed independently of each other. A technology that links an HTTP request and an SQL statement through temporal correlation is therefore needed. Specifically, it can be estimated that H1 and S1 have a relation in terms of processing when statistics shows that the SQL statement S1 is often processed during the processing of the HTTP request H1.

Calculating a correlation between an HTTP request and an SQL statement by a statistical method requires a tremendous amount of calculation. While FIG. 1 is a simplified illustration which shows only a few cases both for HTTP requests and SQL statements, there can actually be several, tens to several hundreds of HTTP requests and several tens to several hundreds of SQL statements per second. This embodiment mode involves estimating a relation between an HTTP request and an SQL statement from temporal correlation, but reduces the amount of the correlation calculation by limiting periods that are used in the calculation by the following method:

Method 1: Select a Period that has Few Disturbance HTTP Requests.

The identification apparatus selects, for the correlation calculation, a period having few disturbance HTTP requests that have been processed at the same time as the target HTTP request. For example, in the case of a period where the target HTTP request alone has been processed, an SQL statement that has been observed in this period has a high probability of being related to the target HTTP request. In the case of a period that has many disturbance HTTP requests, on the other hand, the count of SQL statements observed in this period is often high as well. The correlation calculation in this period has a low probability of yielding a correct relation between a target HTTP request and an SQL statement.

The period #2 is a case where there are many disturbance HTTP requests. In this case, three disturbance HTTP requests, H3, H4, and H5, are processed in addition to the target HTTP request H1. Similarly, an SQL statement that is related to the target HTTP request (the SQL statement S1) and other SQL statements (S3, S4, and S5) are processed. The correlation that is calculated for the period #2 in a mechanical fashion is as follows.

Given below is the probability of a correlation between an HTTP request and an SQL statement that is calculated for the period #2 being correct. For example the probability that the H1→S1 correlation is correct is $1/16$, and the probability that the H1→S3 correlation is correct is $1/16$ as shown below. The same applies to H1→S4 and H1→S5.

HTTP request→SQL statement: Probability of correlation between the pair on the left being correct H1→S1: $1/16$
H1→S3: $1/16$
H1→S4: $1/16$
H1→S5: $1/16$
H3→S1: $1/16$
H3→S3: $1/16$
H3→S4: $1/16$
H3→S5: $1/16$
H4→S1: $1/16$
H4→S3: $1/16$
H4→S4: $1/16$
H4→S5: $1/16$
H5→S1: $1/16$
H5→S3: $1/16$
H5→S4: $1/16$
H5→S5: $1/16$ The above shows that the probability of successfully obtaining the correct correlation H1→S1 is $1/16$. The same calculation that is performed for the period #1, on the other hand, is as follows.

HTTP request→SQL statement: Probability of correlation between the pair on the left being correct

H1→S1: $1/4$
H1→S2: $1/4$
H2→S1: $1/4$
H2→S2: $1/4$

In the calculation for the period #1, the probability of successfully obtaining the correct correlation H1→S1 is $1/4$, which is higher than that in the calculation for the period #2. The amount of calculation is also smaller than that in the calculation for the period #2. However, this calculation method adds to the probability of obtaining wrong correlation as well. For example, in the calculation for the period #1, the calculation method unwontedly allows the probability of the wrong correlation H1→S2 which is ¼ to be reflected on the calculation result. The period #3 in which the same HTTP requests as in the period #1, namely, H1 and H2, have been observed, if used in the correlation calculation, further adds to the probability of obtaining the wrong correlation H1→S2. This is avoided by the following additional method:

Method 2: Diversify the Type of Disturbance HTTP Requests.

Specifically, when the period #1 (H1, H2) is used for the correlation calculation, the period #3 (H1, H2) in which the same HTTP requests have been observed is not used for the correlation calculation, Adding to the probability of obtaining wrong correlation is thus avoided. With the above-mentioned methods put together, periods to be used in the correlation calculation are as follows. The mark "x" at the far left indicates that the period in question is not used in the correlation calculation.

period #1: (H1, H2)
xperiod #2: (H1, H3, H4, H5)
xperiod #3: (H1, H2)
period #4: (H1, H6)

The period #2 which has many disturbance HTTP requests is rejected by Method 1. The period #3 which has the same disturbance HTTP requests as those of the period #1 is rejected by Method 2. Periods selected by the methods of this embodiment mode accordingly have few other HTTP requests than the target HTTP request H1 and have disturbance HTTP request types that are diverse from one another. This increases the probability that the correlation calculation yields, with efficiency and high precision, the correlation between the HTTP request H1 and an SQL statement that is con-elated with the HTTP request H1.

Consequently, the identification of SQL statements that are candidates for the cause of a delay in the processing of an HTTP request (a drop in processing performance) requires less calculation. The amount of data that needs to be read for the calculation is reduced as well. In addition, a reduction in calculation amount means that a single computer can monitor a large number of computer systems. Moreover, periods that facilitate the identification of an SQL statement that is the cause of a delay in the processing of an HTTP request (a drop in processing performance) can be caused to appear deliberately. Now, embodiments of this invention are described. The following embodiments are examples in which Method 1 and Method 2 are applied. However, only Method 1, or only Method 2, out of Method 1 and Method 2 may be applied.

First Embodiment

<Monitoring System>

Figure 2:
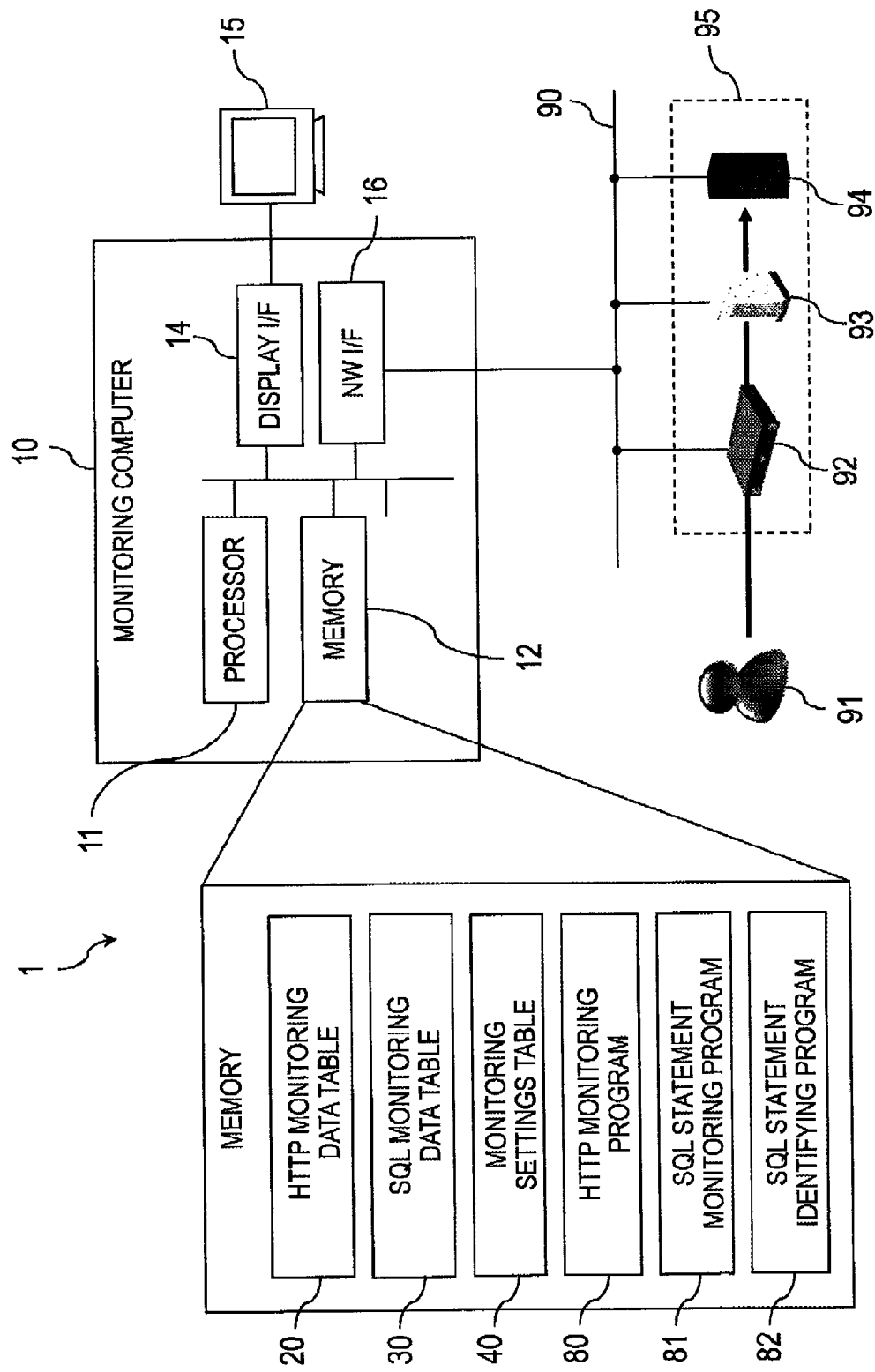
FIG. 2 is a system configuration diagram of a monitoring system according to the first embodiment.

FIG. 2 is a system configuration diagram of a monitoring system according to the first embodiment. A network system 1 includes a monitoring computer 10 and a computer system 95, which is a subject of monitoring by the monitoring computer 10. The monitoring computer 10 and components (described later) of the computer system 95 are coupled by, for example, a local area network (LAN) 90.

The monitoring computer 10 includes a processor 11, a memory 12, a display I/F 14, and a network (NW) I/F 16. The processor 11 executes an HTTP monitoring program 80, an SQL statement monitoring program 81, and an SQL statement identifying program 82, which are stored in the memory 12. The memory 12 also stores an HTTP monitoring data table 20, an SQL monitoring data table 30, and a monitoring settings table 40, which are read and written in by the programs.

The display I/F 14 is coupled to a display apparatus 15. Screens through which the programs receive an input from and output to an operation administrator are displayed on the display apparatus 15 via the display I/F. The NW I/F 16 is coupled to the LAN 90. The programs hold communication to and from the components of the computer system 95 via the NW I/F 16.

The computer system 95 includes a switch 92, a Web/AP server 93, and a database (DB) server 94. The switch 92, the Web/AP server 93, and the DB server 94 are coupled to the LAN 90 to hold communication among one another. The Web/AP server 93 is a server that has functions of one or both of a Web server and an application server. The computer system 95 may include a plurality of Web/AP servers 93. A terminal 91 uses a browser to transmit an HTTP request to the computer system 95. The HTTP request passes through the switch 92 to be processed by the Web/AP server 93 and the DB server 94 in the order stated. The result of the processing is sent back through the switch 92 to the browser that is used by the terminal 91.

The HTTP monitoring program 80 captures packets passing through the switch 92 to measure the response time of an HTTP request (details are described later). The result of the measuring is stored in the HTTP monitoring data table 20.

The SQL statement monitoring program 81 monitors at regular monitoring intervals the performance of SQL statements executed on the DB server 94. The result of the monitoring is stored in the SQL monitoring data table 30. The SQL statement identifying program 82 interacts with the operation administrator to assist in the work of narrowing down SQL statements that may have caused a delay in the processing of an HTTP request.

<Example of Data Stored in the Tables>

FIG. 3 is an explanatory diagram showing an example of data that is stored in the HTTP monitoring data table 20 of FIG. 1. The HTTP monitoring data table 20 is a table for recording information about HTTP requests observed by the HTTP monitoring program 80. Entries 28 (28a to 281 and so on of the HTTP monitoring data table 20 each include pieces of information 21 to 27 measured by the HTTP monitoring program 80 which are described below.

An HTTP request identifier 21 is a unique identifier assigned to each HTTP request. A processing-host-by-processing-host-basis simultaneously executed HTTP request count 22 is a value obtained by compiling, for each processing host 23, the count of HTTP requests that have been executed during the processing of an HTTP request that is identified by the HTTP request identifier 21 of the entry. The processing host 23 is information of a host of the Web/AP server 93 to which the HTTP request of the entry is transmitted. An HTTP request type identifier 24 is a unique identifier for identifying the type of the HTTP request of the entry. The HTTP request type identifier 24 may be the Uniform Resource Identifier (URI) of the HTTP request, a part of the URI, or a hash value that is generated based on the URI. A simplified notation such as H1 and H2 is used in FIG. 3.

A start time 25 is a time at which the computer system 95 starts processing the HTTP request of the entry. For example, the start time 23 is a time at which the HTTP monitoring program 80 captures the HTTP request of the entry. An end time 26 is a time at which the computer system 95 finishes processing the HTTP request of the entry. For example, the end time 26 is a time at which the HTTP monitoring program 80 captures a response message that is issued when the HTTP request of the entry has been processed by the computer system 95.

Over threshold 27 is a flag that indicates whether or not a response time of the HTTP request of the entry which is obtained by subtracting the start time 25 from the end time 26 exceeds a given threshold. In FIG. 3, "Y" is recorded in the case where the threshold is exceeded and "N" is recorded in the case where the threshold is not exceeded. The threshold may be a stationary constant value or may be a dynamic value determined by baseline monitoring, which is described later in a third embodiment of this invention.

FIG. 4 is an explanatory diagram showing an example of data that is stored in the SQL monitoring data table 30. The SQL monitoring data table 30 is a table for recording information about SQL statements observed by the monitoring computer 10. Entries 39 (39a to 39l and so on) of the SQL monitoring data table 30 each include pieces of information 31 to 38 about an individual SQL statement that has been observed by the monitoring computer 10 and the execution of which has been requested of the DB server 94 by the Web/AP server 93.

An SQL identifier 31 is a unique identifier that indicates the type of an SQL statement of the entry. The SQL identifier 31 may be an actual SQL statement requested to be executed, a part of the SQL statement, or a hash value that is generated based on the SQL statement. A start time 32 is a time at which the processing of the SQL statement of the entry is started. An end time 33 is a time at which the processing of the SQL statement is Ended.

A requester host 34 is information of a host of the Web/AP server 93 that requests the execution of the SQL statement of the entry. A transaction ID 35 is the identifier of a transaction that is assigned by the DB server 94 to which the SQL statement of the entry belongs (more specifically, a DBMS running on the DB server 94). SQL statements belonging to the same transaction are assigned the same transaction ID 35. The transaction ID 35 may be blank in some entries because not all of SQL statements are given the transaction ID 35.

A processor time 36, an I/O waiting time 37, and a lock waiting time 38 are items into which the processing time of the SQL statement of the entry is broken down. Some DBMSs do not have an ability to measure those pieces of time information. Other pieces of time information that are items into which SQL statement processing time is broken into than the times 36, 37, and 38 may be stored in the SQL monitoring data table 30.

Figures 5, 6:
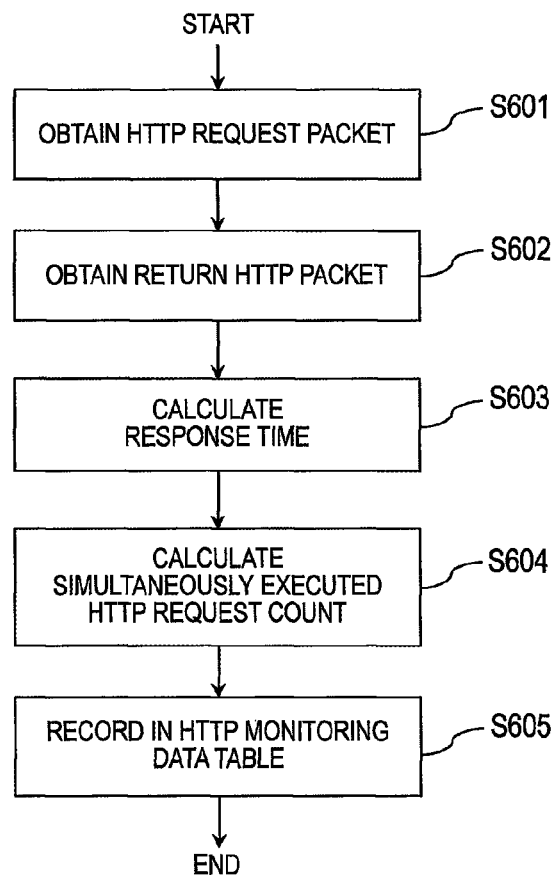
FIG. 5 is an explanatory diagram showing an example of data that is stored in the monitoring settings table.
FIG. 6 is a flow chart illustrating an example of operation processing steps of the HTTP monitoring program.

FIG. 5 is an explanatory diagram showing an example of data that is stored in the monitoring settings table 40. The monitoring settings table 40 is a table for recording monitoring settings information for each computer system 95 separately. The HTTP monitoring program 80 and the SQL statement monitoring program 81 monitor the computer system 95 by following monitoring settings information of the monitoring settings table 40. Each entry of the monitoring settings table 40 records one piece of monitoring settings information.

A system 41 is information that indicates the computer system 95 to which monitoring settings information recorded in the entry is applied. In FIG. 5, the monitoring settings information is applied to a "system A". A monitoring subject 42 is a subject of monitoring based on the monitoring settings information (for example, HTTP requests, a DBMS, or, though not shown, the processor utilization ratio of a server). In the case of the "system A", HTTP requests and a DBMS server are monitoring subjects.

Monitoring properties: values 43 is information that indicates property names of the monitoring settings information and values thereof. The monitoring properties include a monitoring interval and a monitoring subject. In the example of FIG. 5, the monitoring properties: values 43 defines that all HTTP requests of the system A are monitored in real time, and that SQL statements the execution of which is requested of the DBMS are monitored at 1-second intervals.

<Operation Processing Steps of the HTTP Monitoring Program 80>

FIG. 6 is a flow chart illustrating, an example of operation processing steps of the HTTP monitoring program 80. The HTTP monitoring program 80 measures the response time of an HTTP request processed by the computer system 95, and stores the result of the measuring in the HTTP monitoring data table 20.

The HTTP monitoring program 80 captures a packet of an HTTP request transmitted from the terminal 91 to the Web/AP server 93 (Step S601). The HTTP request transmitted from the terminal 91 is sent to the Web/AP server 93 by the switch 92. At this point, the switch 92 duplicates the packet and sends the duplicate to a mirror port. The HTTP monitoring program 80 captures the duplicate packet from the NW I/F 16. The HTTP monitoring program 80 records the captured HTTP request in the memory 12 in order to calculate the response time and the like by checking against, a response message that is a response to the HTTP request.

The HTTP monitoring program 80 captures a packet of a response message that the computer system 95 issues in response to the HTTP request requested by the terminal 91 to be processed (Step S602). The HTTP request requested by the terminal 91 to be processed is processed by the Web/AP server 93 and the DB server 94, and then a response message is generated the response message is transmitted from the Web/AP server 93 to the terminal 91. The transmitted response message passes through the switch 92 as in the HTTP request. The HTTP monitoring program 80 captures a packet of the response message in the same way as in Step S601.

The HTTP monitoring program 80 calculates the response time of the HTTP request (Step S603). The HTTP monitoring program 80 calculates as the response time of the HTTP request a difference between a time at which the HTTP request packet recorded temporarily in Step S601 has been observed and a time at which the response message to the HTTP request obtained in Step S602 has been observed.

The HTTP monitoring program 80 calculates the count of HTTP requests processed in parallel at that point, namely, the processing-host-by-processing-host-basis simultaneously executed HTTP request count (Step S604). The HTTP monitoring program 80 obtains a transmission destination host from the header of each HTTP request recorded in Step S601 in a temporary storage area, and groups the recorded HTTP requests for each transmission destination host, and calculates the HTTP request count of each group as the processing-host-by-processing-host-basis simultaneously executed HTTP request count.

The simultaneously executed HTTP request count may be calculated by other methods. For instance, the HTTP monitoring program 80 may obtain the highest count of HTTP requests that are recorded in the temporary storage area within a fixed period (e.g., one second) to use the obtained count as the simultaneously executed HTTP request count of all HTTP requests processed within this period.

The HTTP monitoring program 80 adds a new entry to the HTTP monitoring data table 20 to record data of the HTTP request (Step S605). When creating the new entry, the HTTP monitoring program 80 generates an identifier that is unique throughout the HTTP monitoring data table 20, and records the generated identifier as the HTTP request identifier 21. The HTTP monitoring program 80 also stores the value calculated in the Step S604 as the processing-host-by-processing-host-basis simultaneously executed HTTP request count 22.

The HTTP monitoring program 80 obtains a transmission destination host and a URL from the header of the HTTP request stored in the temporary storage area in Step S601, and records the host and the URL as the processing host 23 and the HTTP request type identifier 24, respectively. The HTTP request type identifier 24 may be the URL itself or another identifier generated based on the URL, as described above.

The HTTP monitoring program 80 records the time of capture of the HTTP request in Step S601 as the start time 20, and records the time of capture of the response message in Step S602 as the end time 26. In the case where a threshold for the response time is set, the HTTP monitoring program 80 records "Y" when the response time obtained in Step S603 exceeds the threshold, and records "N" when the obtained response time does not exceed the threshold.

The operation of the SQL statement monitoring program 81 is described next. The SQL statement monitoring program 81 requests the DB server 94 to provide monitoring data at certain monitoring intervals. The SQL statement monitoring program 81 reads an entry 44c of the monitoring settings table 40. The monitoring interval is therefore stored in the monitoring settings table 40 of FIG. 5. Requested to provide monitoring data, the DB server 94 sends information about an SQL statement that is in operation at the time the request is made to the SQL statement monitoring program 81 in response. The SQL statement monitoring program 81 stores the obtained information in the SQL monitoring data table 30. Before a description on a relevant flow chart is given, an example of operation that the operation administrator is assumed to perform is described.

FIG. 7 is an explanatory diagram illustrating an example of a screen that is displayed on the display apparatus 15 by the SQL statement identifying program 82. The operation administrator operates on this screen to specify a processing delay HTTP request for which a causal SQL statement is to be identified. The SQL statement identifying program 82 identifies candidates for the causal SQL statement of the processing delay HTTP request specified, and displays the result on the screen.

The screen example of FIG. 7 includes two panes: an upper pane and a lower pane. The upper pane displays a processing delay HTTP request list 100. The SQL statement identifying program 82 refers to the HTTP monitoring data table 20 to obtain entries where the over threshold 27 is "Y", and displays the obtained entries as entries 101 (101a to 101c) of the processing delay HTTP request list 100 on the screen. The operation administrator decides on an entry for which the causal SQL statement is to be identified out of the displayed entries 101, and checks a checkbox 102 of the entry. The entry 101a is checked in the screen example of FIG. 7.

The SQL statement identifying program 82 receives the processing delay HTTP request that is checked by the operation administrator (hereinafter simply referred to as "investigation subject"), and narrows SQL statements down to a few candidates for the causal SQL statement of the investigation subject. This narrowing processing corresponds to a flow chart of FIG. 8 which is described later. The lower pane of the screen displays a causal SQL list 103 which lists SQL statements remaining after the narrowing down by the SQL statement identifying program 82. Causal SQL entries 104 are displayed on rows of the causal SQL list 103. Each causal SQL entry 104 includes a rating 105 which indicates the likelihood of the entry's SQL statement being the cause. The operation administrator recognizes the causal SQL statement which is the cause of a delay by referring to the rating 105. The operation of the SQL statement identifying program 82 is described next with reference to the flow chart of FIG. 8.

Figure 8:
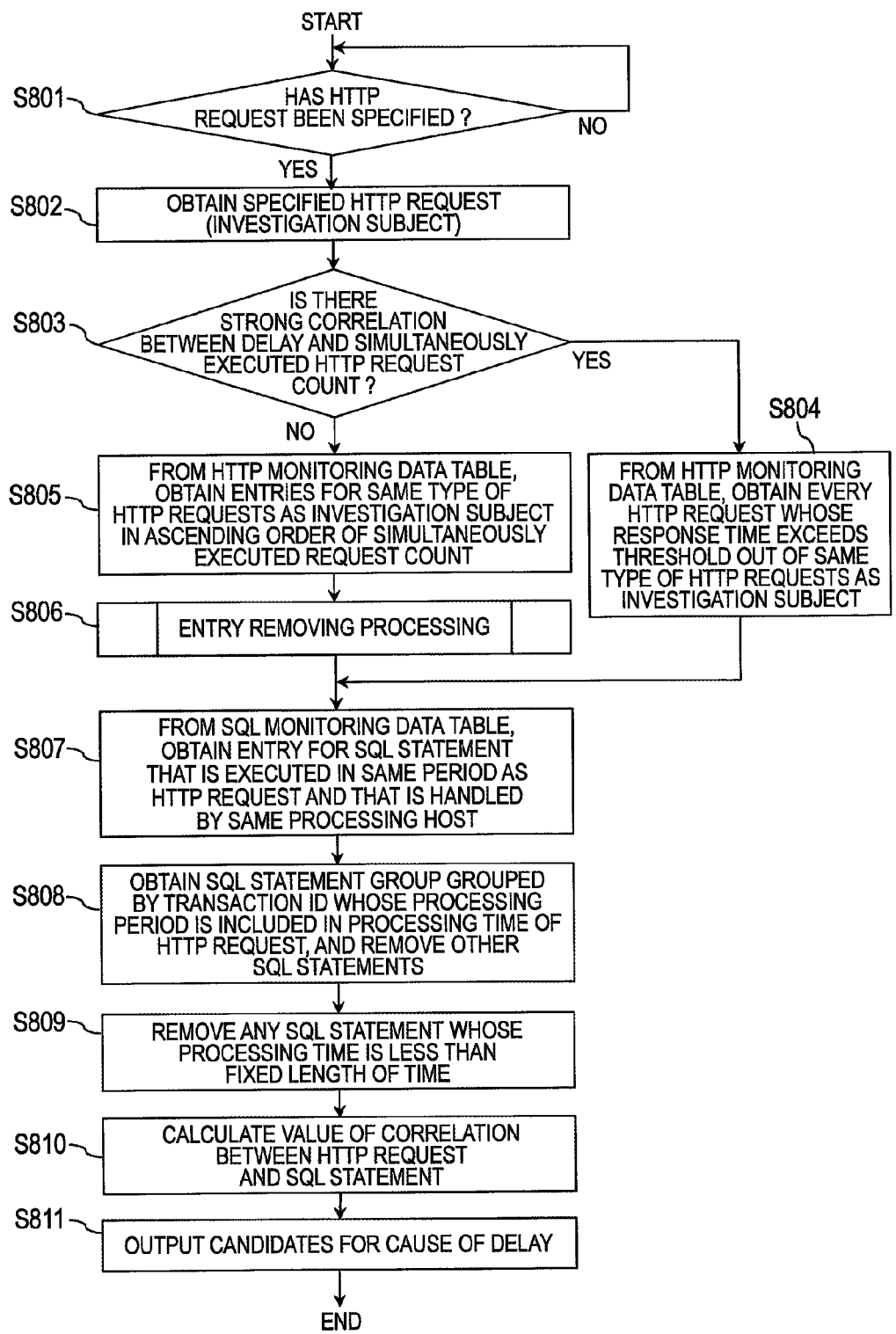
FIG. 8 is a flow chart illustrating an example of processing steps that are executed by the SQL statement identifying program.

FIG. 8 is a flow chart illustrating an example of processing steps that are executed by the SQL statement identifying program 82. The SQL statement identifying program 82 waits for the operation administrator to specify an HTTP request on the screen (Step S801: No). When an HTTP request is specified by checking a checkbox as illustrated in FIG. 7 (Step S801: Yes), the SQL statement identifying program 82 obtains information of the specified investigation subject (Step S802). The type of the investigation subject is "H1" in the following description.

The SQL statement identifying program 82 next confirms whether or not there is a strong correlation between the processing delay of the investigation subject and the processing-host-by-processing-host-basis simultaneously executed HTTP request count (Step S803). Whether there is a strong correlation or not can be determined by a correlation calculation method that is commonly used. For example, the SQL statement identifying program 82 calculates a coefficient of correlation between the period length of a past period, in which an HTTP request of the same type as the investigation subject has been processed and the processing-host-by-processing-host-basis simultaneously executed HTTP request count in the same period. The period length of a past period in which an HTTP request of the same type as the investigation subject has been processed is a length of time obtained by subtracting the processing start time of the HTTP request of the same type as the investigation subject from the processing end time of the HTTP request. In this method, the SQL statement identifying program 82 determines that there is a strong correlation when the calculated correlation coefficient exceeds a threshold.

The SQL statement identifying program 82 determines whether or not there is a strong correlation and, when a strong correlation is recognized (Step S803: Yes) proceeds to Step S804. When there is no strong correlation (Step S803), the SQL statement identifying program 82 proceeds to Step S805. This is because the application of Method 1 described above which is to "select periods that have few disturbance HTTP requests" is withheld when the effect of Method 1 is small.

In the case where a delay to the processing of the investigation subject occurs only when the HTTP request count of the computer system 95 is high (in other words, when the processing-host-by-processing-host-basis simultaneously executed HTTP request count is high), the effect of Method 1 which is to select periods that are low in Processing-host-by-processing-host-basis simultaneously executed HTTP request count is small. Step S803 and Step S804 are optional and the SQL statement identifying program 82 does not always need to execute Steps S803 and S804.

When there is a strong correlation (Step S803: Yes), the SQL statement identifying program 82 obtains from the HTTP monitoring data table 20 entries for HTTP requests of the same type as the investigation subject (entries where the HTTP request type identifier 24 is "H1" in this example) that has "Y" as the value of the over threshold 27 (Step S804). After Step S804, the SQL statement identifying program 82 proceeds to Step S807.

When there is no strong correlation (Step S803: No), on the other hand, the SQL statement identifying program 82 refers to the HTTP monitoring data table 20 to obtain entries for HTTP requests of the same type as the investigation subject (entries where the HTTP request type identifier 24 is "H1" in this example) (hereinafter referred to as "same-type request") in ascending order of the processing-host-by-processing-host-basis simultaneously executed HTTP request count 22 (Step S805).

In the case where the investigation subject is of the type "H1", for example, the SQL statement identifying program 82 obtains the entries 28a, 28c, 28e, 28i, and 28k where the HTTP request type identifier is "H1". Entries to be obtained are, for example, the first to X-th entries in ascending order of the processing-host-by-processing-host-basis simultaneously executed HTTP request count 22, or entries in which the processing-host-by-processing-host-basis simultaneously executed HTTP request count 22 is a given count or less.

The SQL statement identifying program 82 next executes entry removing processing (Step S806). The entry removing processing (Step S806) is processing of removing entries that have the same combination of disturbance HTTP requests from the set of same-type HTTP requests obtained in Step S805 in accordance with Method 2 described above which is to "diversify the type of disturbance HTTP requests".

Specifically, the SQL statement identifying program 82 obtains from the HTTP monitoring data table 20 entries for HTTP requests (disturbance HTTP requests) that have been processed in the same period as the same-type HTTP requests obtained in Step S805 and handled by the same processing host 23. "Sets" of an HTTP request that is the same type as the investigation subject and obtained disturbance tarp requests are thus formed.

The entry 28a which holds one of the same-type HTTP requests obtained in Step S805 is taken as an example. When the processing period in the entry 28 (04:0000.000 to 0400:10.000) is given as the period #1, the entry 28b for an HTTP request that has been processed in the period #1 is obtained as an entry for a disturbance HTTP request. The HTTP request type identifier in the entry 28b is "H2".

A set (H1, H2) is thus formed in the period #1. Similarly, in the case of the entry 28e which holds one of the same-type HTTP requests obtained in Step S805, a set (H1, H3, H4, H5) is formed. In the case of the entry 28i, a set (H1, H2) is formed in the period #3 (01:00:00.000 to 01:00:05.000). In the case of the entry 28k, a set (H1, H6) is formed in the period #4 (00:00:00.000 to 00:00:05.000).

The SQL statement identifying program 82 compares disturbance HTTP request types of one set with those of another set, and identifies sets that have the same combination of disturbance HTTP requests. In the case where the same combination of disturbance HTTP requests is shared by a plurality of sets the SQL statement identifying program 82, allows only one of the sets to remain and removes the rest of the sets. For example, of the set (H1, H2) in the period #1 and the set (H1, H2) in the period #3 which are the same, the SQL statement identifying program 82 removes the set (H1, H2) in the period #1.

Sets are determined as having the same combination of disturbance HTTP request types when the combination in one set matches the combination in another set completely or partially. For example, the combination in one set and the combination in another set may be determined as the same when half the disturbance HTTP requests of the combinations match. A set (H1, H2, H3) in a period, for example, partially matches the set (H1, H2) in the first period #1. In this case, H2 which constitutes a half of the disturbance HTTP requests H2 and H3 of the set (H1, H2, H3) is overlapping, and the SQL statement identifying program 82 accordingly removes the set (H1, H2, H3).

The SQL statement identifying program 82 next obtains, for each HTTP request remaining after the entry removing processing (Step S800), an entry for an SQL statement that is paired with the HTTP request from the SQL monitoring data table 30 (Step S807). Specifically, the SQL statement identifying program 82 obtains the SQL entry 39 of the SQL monitoring data table 30 for an SQL statement that has been processed in the same period as the HTTP request of the entry remaining after the entry removing processing (Step S806) and that has the processing host 23 of the HTTP request as the requestor host 34. In the case where Step S804 has been executed, the SQL statement identifying program 82 obtains from the SQL monitoring data table 30 an entry for an SQL statement that is to be paired with an HTTP request for each HTTP request obtained in Step S804 (Step S807).

The SQL statement identifying program 82 then uses the transaction ID 35 of the SQL monitoring data table 30 to filter the SQL entries obtained in Step S807 (Step S808). Specifically, the SQL statement identifying program 82 obtains the transaction ID 35 for each SQL entry obtained in Step S807, and confirms whether or not the SQL monitoring data table 30 includes another entry that holds the same transaction ID. If an entry that holds the same transaction ID is found in the table, it means that processing of a transaction having this transaction ID has begun before the start of processing of the same-type HTTP request. The SQL entries 39 that have the same transaction ID 35 can therefore be removed. Step S808 is optional and is not an indispensable step.

Thereafter, the SQL statement identifying program 82 removes any SQL statement whose processing time is less than a fixed length of time to exclude the SQL statement from subjects of a correlation calculation in Step S810 and subsequent steps (Step S809). For example, the SQL statement identifying program 82 may remove the SQL entry 39 where the processing time is less than a fixed length of time, or may remove, an SQL entry where the processing time is less than a monitoring interval for monitoring SQL statements by referring to the monitoring settings table 40. The SQL statement identifying program 82 may also remove other SQL entries 39 than an entry for an SQL statement that has been processed in the same period as the investigation subject specified by the operation administrator in Step S802.

The SQL statement identifying program 82 calculates the value of correlation between an HTTP request and an SQL statement (Step S810). For example, the probability of cross-correlation between an HTTP request and an SQL statement is calculated as in the correlation probability calculation method of FIG. 1. Steps of the calculation are those of a correlation probability calculation method that is commonly used.

The SQL statement identifying program 82 displays on the causal SQL list 103 of FIG. 7 SQL statements that are large in HTTP request-SQL statement correlation value, as candidates for the cause of the delay (Step S811). When displaying the candidates, the SQL statement identifying program 82 assigns a high rating 105 to each SQL statement that is large in correlation value as an index that helps the operation administrator to comprehend. The rating 105 can be calculated by any method. For example, correlation values having a range of value of 0 to 1 may be divided into units of 0.2 to assign five levels of ratings starting from the smallest value. The operation administrator can immediately recognize that an SQL statement rated high in the rating 105 is likely to be the cause of the processing delay of the HTTP request. This enables the operation administrator to efficiently narrow down candidates for an SQL statement that is the cause of the processing delay of the HTTP request.

Figure 9:
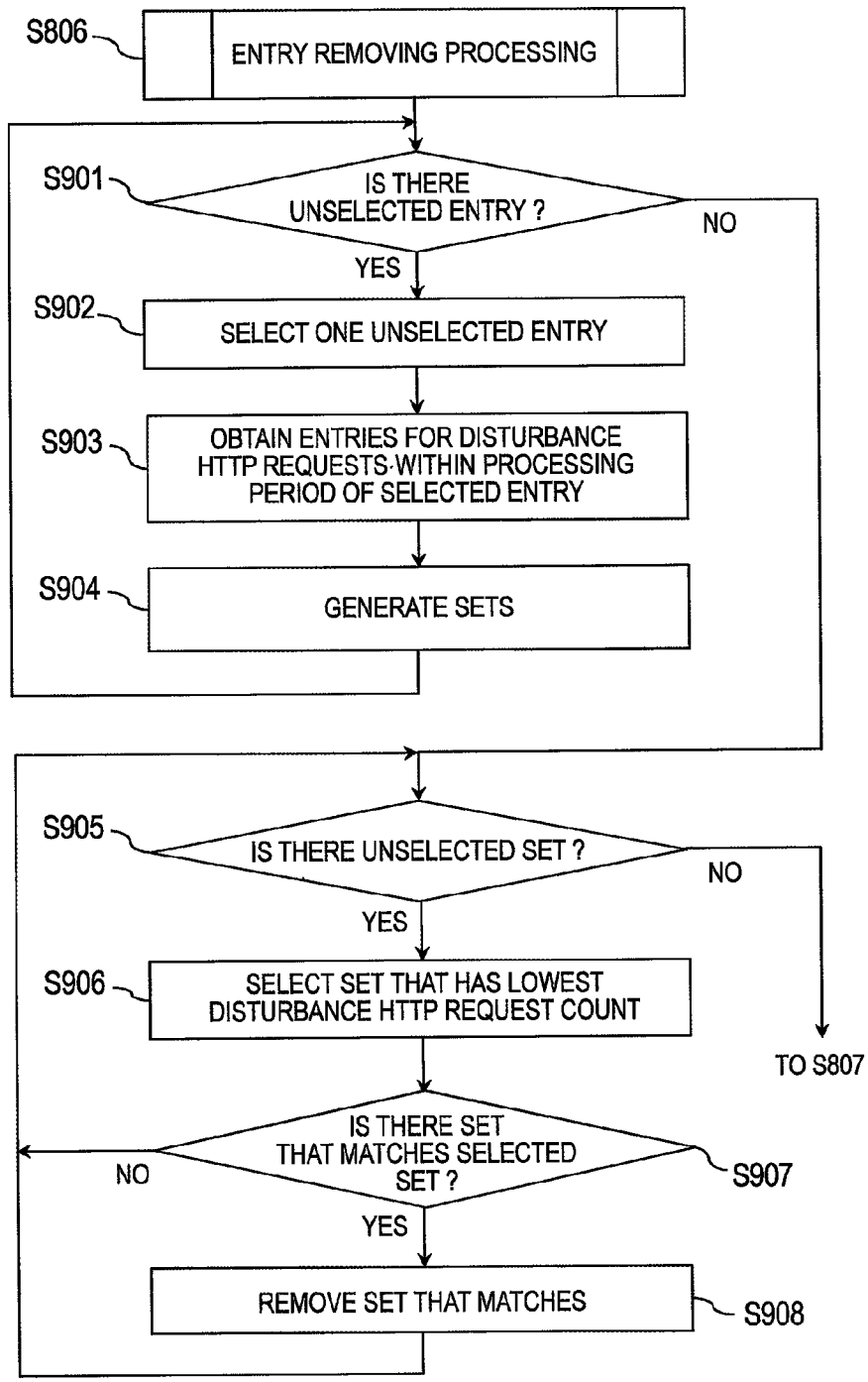
FIG. 9 is a flow chart illustrating an example of detailed processing steps of the entry removing processing, (Step S806) of FIG. 8.

FIG. 9 is a flow chart illustrating an example of detailed processing steps of the entry removing processing (Step S806) of FIG. 8. The SQL statement identifying program 82 determines whether or not the entries obtained in Step S805 include an entry that has not been selected (Step S901). When one or more unselected entries are included (Step S901: Yes), the SQL statement identifying program 82 selects one unselected entry (Step S902). The SQL statement identifying program 82 obtains entries for disturbance HTTP requests that have been processed during the processing period of the selected entry (Step S903), and generates a set such as the set (H1, H2) described above (Step S904). The SQL statement identifying program 82 then returns to Step S901.

When it is determined in Step S901 that there is no unselected entry (Step S901: No), the SQL statement identifying program 82 determines whether or not there is a set that has been generated in Step S904 and that has not been selected (Step S905). In the case where one or more unselected sets are found (Step S905: Yes), the SQL statement identifying program 82 selects a set that has the fewest disturbance HTTP requests (Step S906).

The SQL statement identifying program 82 determines whether or not there is a set that matches the selected set (Step S907). When there is a set that matches (Step S907: Yes), the SQL statement identifying program 82 removes this set (Step S908) and returns to Step S905. When there is no set that matches (Step S907 No), the SQL statement identifying program 82 returns to Step S905. In the case where an unselected set is not found in Step S905 (Step S905: No), the SQL statement identifying program 82 ends the entry removing processing (Step S806) and proceeds to Step S807.

According to the first embodiment, the count of HTTP requests used in the identification of the cause of a failure can thus be reduced by selecting periods that have few disturbance HTTP requests. The calculation amount is reduced as a result.

The count of HTTP requests used in the identification of the cause of a failure can be reduced further by diversifying the type of disturbance HTTP requests. The calculation amount is accordingly reduced. Diversifying the type of disturbance HTTP requests also helps to avoid adding to the probability of obtaining wrong correlation, which improves precision in narrowing down SQL statements that are candidates for the cause of a delay in the processing of an HTTP request (a drop in processing performance).

Second Embodiment

A second embodiment of this invention is described next. In the first embodiment, the SQL statement identifying program 82 executes SQL statement identifying processing after receiving a request to identify an SQL statement from the operation administrator. In short, the SQL statement identifying processing is executed on demand. In the second embodiment, on the other hand, the SQL statement identifying program 82 executes SQL statement identifying processing in the background ahead of the request. The SQL statement identifying program 82 is activated periodically. The SQL statement identifying program 82 executes the SQL statement identifying processing on an HTTP request that is added after the last time the SQL statement identifying program 82 is activated (hereinafter referred to a "added HTTP request").

In short, the SQL statement identifying program 82 processes only a differential from the last time. In this way, SQL statements that are candidates for the cause of a failure can be output immediately when the operation administrator requests the SQL statement identifying processing. In the second embodiment, components and processing that are the same as the ones in the first embodiment are denoted by the same reference symbols, and descriptions thereof are omitted.

<System Configuration of the Network System 1>

Figure 10:
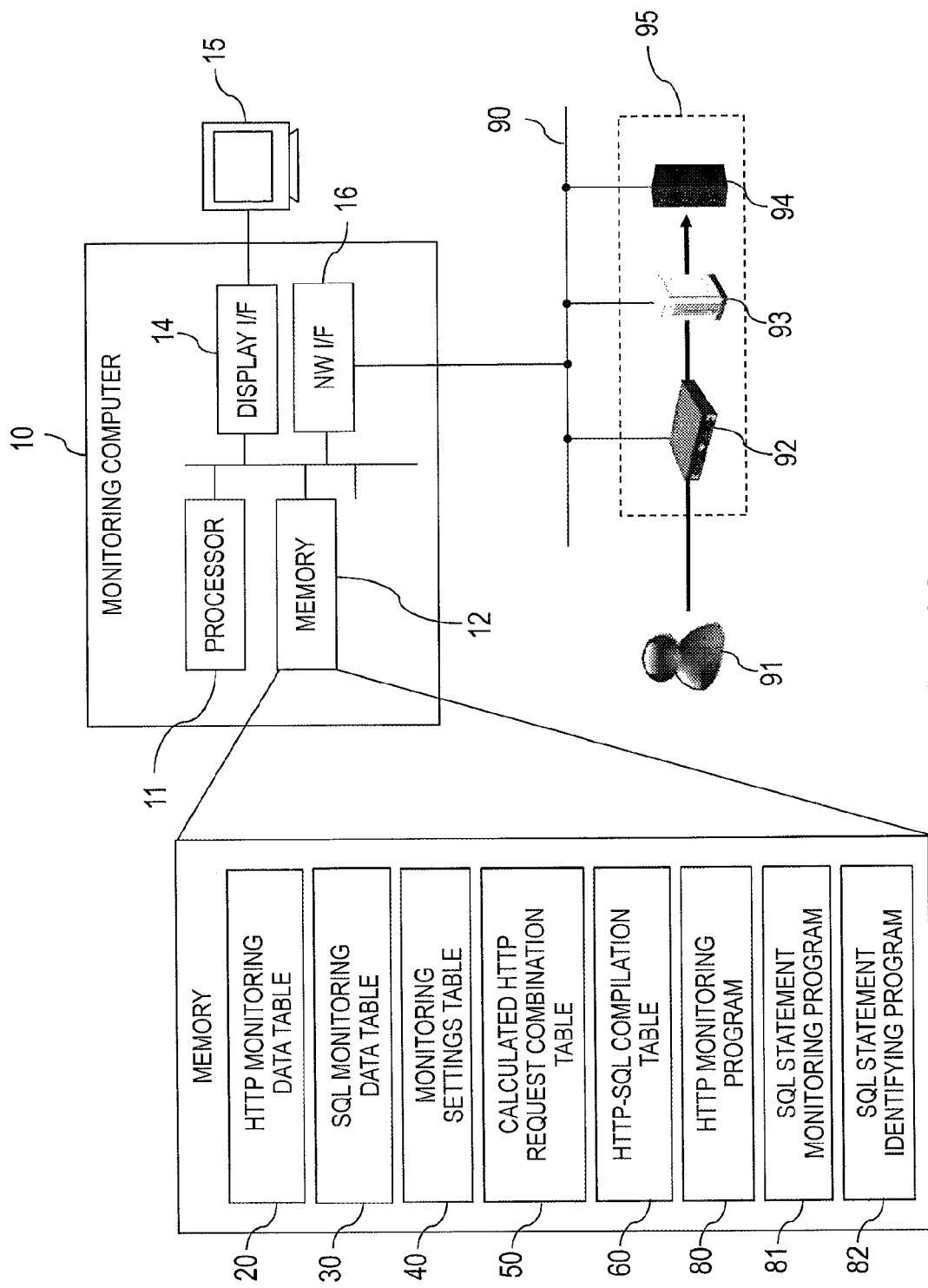
FIG. 10 is a system configuration diagram of the network system according to the second embodiment.

FIG. 10 is a system configuration diagram of the network system 1 according to the second embodiment. Differences from the first embodiment are the addition of to calculated HTTP request combination table 50 and an HTTP-SQL compilation table 60 to the memory 12, and the specifics of the operation flow of the SQL statement identifying program 82.

The SQL statement identifying program 82 calculates a correlation between an HTTP request and an SQL statement, and updates the HTTP-SQL compilation table 60 with the result of the calculation. At this point, the SQL statement identifying program 82 records in the calculated HTTP request combination table 50 a combination of disturbance HTTP requests that have been calculated in parallel during the period used for the correlation calculation. The SQL statement identifying program 82 refers to records of the calculated HTTP request combination table 50 before calculating a correlation to remove the same combination of disturbance HTTP requests by Method 2.

<Example of Data Stored in the Tables>

FIGS. 11A and 11B are explanatory diagrams each showing an example of data stored in a table that is used in the network system 1 according to the second embodiment. FIG. 11A shows an example of data that is stored in the calculated HTTP request combination table 50. The calculated HTTP request combination table 50 records, for each HTTP request type identifier 51 of an HTTP request that is an investigation subject, the identifiers and types of disturbance HTTP requests and the count of HTTP requests that are executed simultaneously. A case is taken as an example in which the calculated HTTP request combination table 50 has no entries yet, the type of an HTTP request for which an association relation with an SQL statement is to be obtained, is "H1", and one HTTP request that is of the type "H1" has been observed.

An entry 55a is created in the calculated HTTP request combination table 50 in this case. Specifically. "H1" is recorded as the HTTP request type identifier 51, which indicates the type of an HTTP request whose association relation is to be obtained, and "1" is recorded as a processing-host-by-processing-host-basis simultaneously executed HTTP request count 53. As a disturbance HTTP request type 54, "(null)" is recorded because there are no HTTP requests that have been processed in the same period as the HTTP request in question, i.e., no disturbance HTTP requests. A unique identifier assigned to the HTTP request of the type "H1" is recorded as an HTTP request identifier 52, which is the same data as the HTTP request identifier 21 in the HTTP monitoring data table 20.

Next, in this example, an HTTP request for which an association relation with an SQL statement is to be obtained is of the type "H1" the identifier of this request is "100"), and one HTTP request of the type "H2" is observed in the same period as the "H1" request. Then an entry 55b is created in the calculated IMP request combination table 50. The created entry has "111" as the HTTP request type identifier 51, "100" as the HTTP request identifier 52, "2" as the processing-host-by-processing-host-basis simultaneously executed HTTP request count 53, and "H2" as the disturbance HTTP request type 54.

FIG. 11B shows an example of data that is stored in the HTTP-SQL compilation table 60. The HTTP-SQL compilation table 60 stores, for each HTTP request type identifier 61, an appearance count 63 of an SQL statement type (an SQL identifier 62) that is observed within a period where the HTTP request in question is processed. For example, in the case where an SQL statement that has an SQL identifier "S1" is observed thirty times during the processing period of an HTTP request whose HTTP request type identifier is "H1", an entry 64a is created in the HTTP-SQL compilation table 60. Similarly, in the case where "S2" is observed three times and "S3" is observed six times, an entry 64b and an entry 64c are created, respectively, in the HTTP-SQL compilation table 60.

<SQL Statement Identifying Processing>

Figure 12:
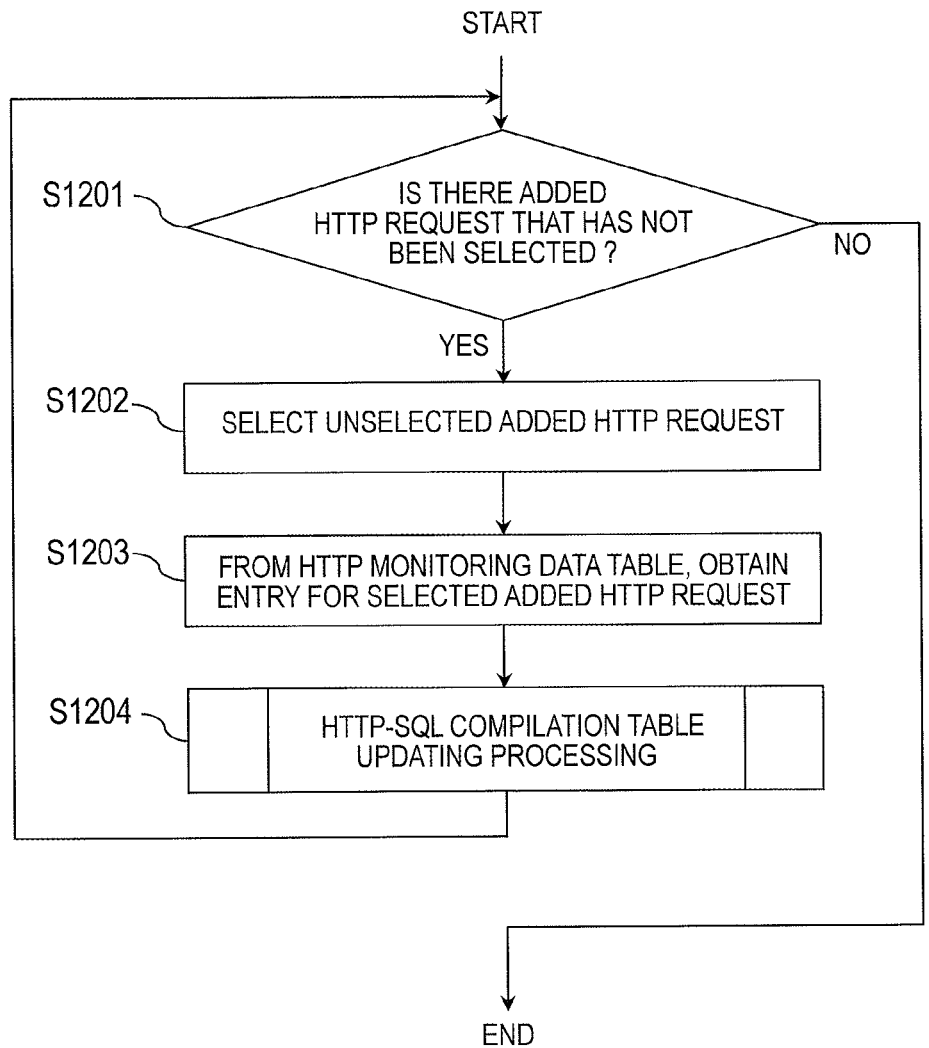
FIG. 12 is a flow chart illustrating an example of detailed processing steps of SQL statement identifying processing that is executed by the SQL statement identifying program according to the second embodiment.

FIG. 12 is a flow chart illustrating an example of detailed processing steps of SQL statement identifying processing that is executed by the SQL statement identifying program 82 according to the second embodiment. The SQL statement identifying program 82 is activated periodically and, when activated, refers to the HTTP monitoring data table 20 to determine whether or not there is an added HTTP request that has not been selected (Step S1201).

When one or more unselected added Firm requests are found (Step S1201: Yes), the SQL statement identifying program 82 selects one unselected added HTTP request (Step S1202), and obtains an entry for the selected, added HTTP request from the HTTP monitoring data table (Step S1203). For example, when the HTTP request type identifier 24 of the selected added HTTP request is "H1", the SQL statement identifying program. 82 selects HTTP requests that have "H1" as the HTTP request type identifier 24 in the HTTP monitoring data table 20 and obtains the entries 28a, 28c, 28e for the selected HTTP requests.

The SQL statement identifying program 82 then executes HTTP-SQL compilation table updating processing (Step S1204). The HTTP-SQL compilation table updating processing (Step S1204) is processing that is executed for a selected added HTTP request in the background in accordance with Method 1 and Method 2 described above, and details of this processing are described later with reference to FIG. 13. After the HTTP-SQL compilation table updating processing (Step S1204), the SQL statement identifying program 82 returns to Step S1201.

When it is determined that there is no unselected added request (Step S1201: No), the SQL statement identifying program 82 ends the processing. The SQL statement identifying processing can be executed in the background for each added HTTP request in this manner.

Figure 13:
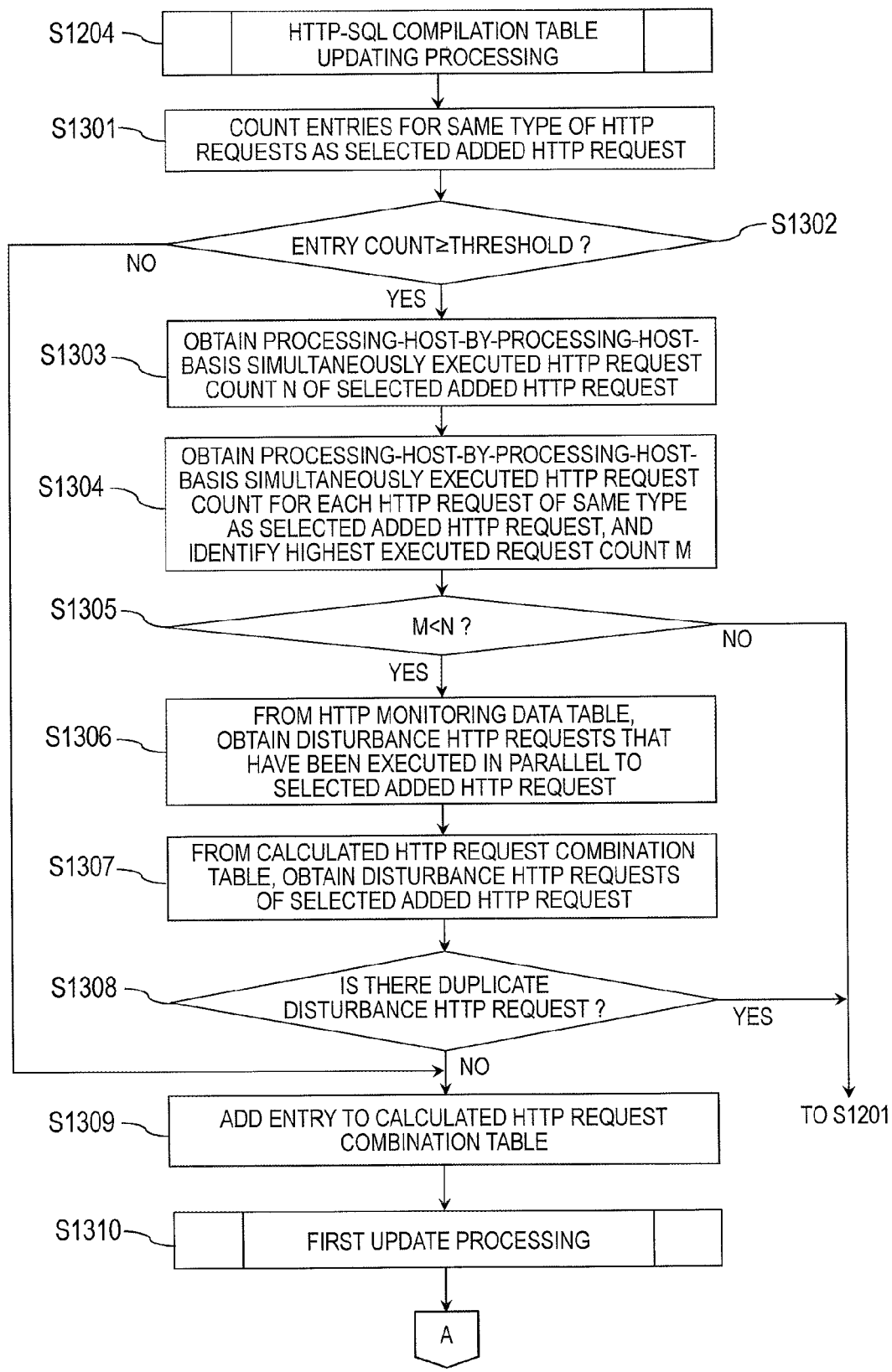
FIG. 13 is a flow chart (the first half) illustrating an example of detailed processing steps of the HTTP-SQL compilation table updating processing (Step S1204) of FIG. 12.

FIG. 13 is a flow chart (the first half) illustrating an example of detailed processing steps of the HTTP-SQL compilation table updating processing (Step S1204) of FIG. 12. In FIG. 13, the SQL statement identifying program 82 first counts entries of the calculated HTTP request combination table 50 where the HTTP request type identifier 51 is the same as the type of the selected added HTTP request (an entry count) (Step S1301).

For example, when the HTTP request type identifier 51 of the selected added HTTP request is "H1", the SQL statement identifying program 82 counts the entries 55a, 55b, 55c, 55d, 55e the calculated HTTP request combination table 50 where the HTTP request type identifier 51 is "H1". This entry count is the processing-host-by-processing-host-basis simultaneously executed HTTP request count of the selected added HTTP request.

The SQL statement identifying program 82 next determines whether or not the processing-host-by-processing-host-basis simultaneously executed HTTP request count, which is the entry count obtained by counting, is equal to or more than a threshold. The SQL statement identifying program 82 executes Steps S1303 to S1308 when the count is equal to or more than the threshold (Step S1302: Yes), and proceeds to Step S1309 when the count is less than the threshold (Step S1302: No).

Steps S1301 and S1302 are for determining whether data that has already been recorded is sufficient for the correlation calculation of the selected added HTTP request. In the case where the processing-host-by-processing-host-basis simultaneously executed HTTP request count is equal to or more than the threshold (Step S1302: Yes), processing of determining whether or not the currently selected added HTTP request is more useful than existing HTTP requests is executed (Steps S1303 to S1308). Steps S1301 and S1302 are optional and may be omitted.

Steps S1303 to S1308 are described. When the count is equal to or more than the threshold (Step S1302: Yes), the SQL statement identifying program 82 obtains from the HTTP monitoring data table 20 the processing-host-by-processing-host-basis simultaneously executed HTTP request count 22 of the selected added HTTP request (Step S1303). The obtained processing-host-by-processing-host-basis simultaneously executed HTTP request count 22 of the selected added HTTP request is represented by "N". For example, N is 4 in the case where the selected added HTTP request is an HTTP request recorded in the entry 28e of FIG. 3.

The SQL statement identifying program 82 next refers to the calculated HTTP request combination table 50 to obtain, for each HTTP request that is of the same type as the selected added HTTP request, the processing-host-by-processing-host-basis simultaneously executed HTTP request count 53, and identifies a highest executed request count M, which is the highest of the obtained counts 53 (Step S1304).

For example, in the case where the selected added HTTP request is an HTTP request recorded in the entry 28e of FIG. 3, the HTTP request type identifier 24 is "H1". The SQL statement identifying program 82 accordingly obtains the processing-host-by-processing-host-basis simultaneously executed HTTP request count 53 from the entries 55a, 55b, 55c, 55d, 55e . . . of the calculated HTTP request combination table 50 where the HTTP request type identifier 51 is "H1". The SQL statement identifying program 82 identifies the highest executed request count M of the obtained counts 53. The count M is 3 in the case of the calculated HTTP request combination table 50 of FIG. 11A.

Thereafter, the SQL statement identifying program 82 determines whether or not the processing-host-by-processing-host-basis simultaneously executed HTTP request count N of the selected added HTTP request is greater than the highest executed request count M (Step S1305). The SQL statement identifying program 82 proceeds to Step S1306 when the count N is greater than the count M (Step S1305: Yes). In the example given above, where N is 4 and M is 3, the SQL statement identifying program 82 proceeds to Step S1306.

In the case where the processing-host-by-processing-host-basis simultaneously executed HTTP request count N is equal to or less than the highest executed request count M (Step S1305: No), on the other hand, the SQL statement identifying program 82 ends the HTTP-SQL compilation table updating processing (Step S1204) for the selected added HTTP request, and returns to Step S1201 of FIG. 12. In short, cases where the count N is equal to or less than the past processing-host-by-processing-host-basis simultaneously executed MIT request count are excluded. An unselected added HTTP request is thus selected and the HTTP-SQL compilation table updating processing (Step S1204) is executed for the added HTTP request.

In Step S1306, the SQL statement identifying program 82 obtains from the HTTP monitoring data table 20 disturbance HTTP requests that have been executed in parallel to the selected added HTTP request (Step S1306). Specifically, the SQL statement identifying program 82 obtains from the HTTP monitoring data table 20 entries for HTTP requests that have been processed in, for example, the processing period (a period from the start time 25 to the end time 26) of the selected added HTTP request (disturbance HTTP requests).

In the case of the entry 2e of FIG. 3, the processing period is a period between the start time "02:00:00.000" and the end time "02:00:05.000". The SQL statement identifying program 82 in this case obtains the entries 28f, 28g, and 28h for the disturbance Firm requests H3 to H5 which have the same processing period as the processing period in the entry 28e. The processing period of a disturbance firm request that is regarded as the same as the processing period of a selected added HTTP request may be contained within the processing period of the selected added HTTP request, or may partially overlap with the processing period of the selected added HTTP request, or may contain the processing period of the selected added HTTP request.

The SQL statement identifying program 82 next obtains disturbance HTTP requests of the selected added HTTP request from the calculated HTTP request combination table 50 (Step S1307). For example, when the HTTP request type identifier 24 of the selected added HTTP request is "H1", the SQL statement identifying program 82 identifies the entries 55a to 55e of the calculated HTTP request combination table 50 which hold the same type "H1". The SQL statement identifying program 82 obtains "H2", "H3", "H4", "H5", "H6", and "H7" recorded as the disturbance HTTP request type 54 in the entries 55a to 55e.

The SQL statement identifying program 82 determines whether or not there is an Overlap between the disturbance HTTP requests obtained in Step S1305 and the disturbance HTTP requests obtained in Step S1307 in accordance with "Method 2: diversify the type of disturbance HTTP requests" (Step S1308). Specifically, the SQL statement identifying program 82 determines whether or not there is an overlap between the IMP request type identifier 24 of the disturbance HTTP requests and the disturbance HTTP request type 54.

In the case where the selected added HTTP request is an HTTP request recorded in the entry 28e of FIG. 3, the disturbance HTTP requests obtained in Step S1306 are H3 to H5, and the disturbance HTTP requests obtained in Step S1307 are H2 to H7. The disturbance HTTP requests H3 to H5 are therefore overlapping. The SQL statement identifying program 82 may determine in Step S1308 that there is an overlap between the disturbance HTTP requests of Step S1306 and the disturbance HTTP requests of Step S1307 when the two groups match completely or partially. For example, it may be determined that there is an overlap when a half the disturbance HTTP requests in the two groups match.

When there is overlap (Step S1308: Yes), the SQL statement identifying program 82 ends the HTTP-SQL compilation table updating processing (Step S1204) for the selected added IMP request, and returns to Step S1201 of FIG. 12. An unselected added HTTP request is selected and the HTTP-SQL compilation table updating processing (Step S1204) is executed for the added HTTP request in this manner.

When there is no overlap (Step S1308: No), on the other hand, the SQL statement identifying program 82 proceeds to Step S1309. The selected added HTTP request can thus be evaluated in relation to newly added disturbance HTTP requests which do rot overlap.

Thereafter, the SQL statement identifying program 82 adds entries for HTTP requests to the calculated HTTP request combination table 50 (Step S1309). To give a concrete example, when the answer to Step S1308 is "No", the SQL statement identifying program 82 adds entries for the selected added HTTP request and the disturbance HTTP requests obtained in Step S1306. New disturbance HTTP requests are registered in the calculated HTTP request combination table 50 in this manner.

In the case where the answer to Step S1302 is "No", the SQL statement identifying program 82 adds an entry for the selected added HTTP request. The disturbance HTTP request type 54 in this entry is "null".

The SQL statement identifying program 82 then executes first update processing (Step S1310), The SQL statement identifying program 82 executes in the first update processing (Step S1310) an update in which an entry is added to the HTTP-SQL compilation table 60. Specifically, the SQL statement identifying program 82 newly adds to the HTTP-SQL compilation table 60 an entry that holds the selected added HTTP request, an SQL statement that has been processed during the processing period of the HTTP request, and the appearance count of the SQL statement. In the case where the entry has already been added, the SQL statement identifying program 82 updates the appearance count. Details of the first update processing (Step S1310) are described later with reference to FIG. 15. After the first update processing (Step S1310), the SQL statement identifying program 82 proceeds to Step S1401 of FIG. 14.

Figure 14:
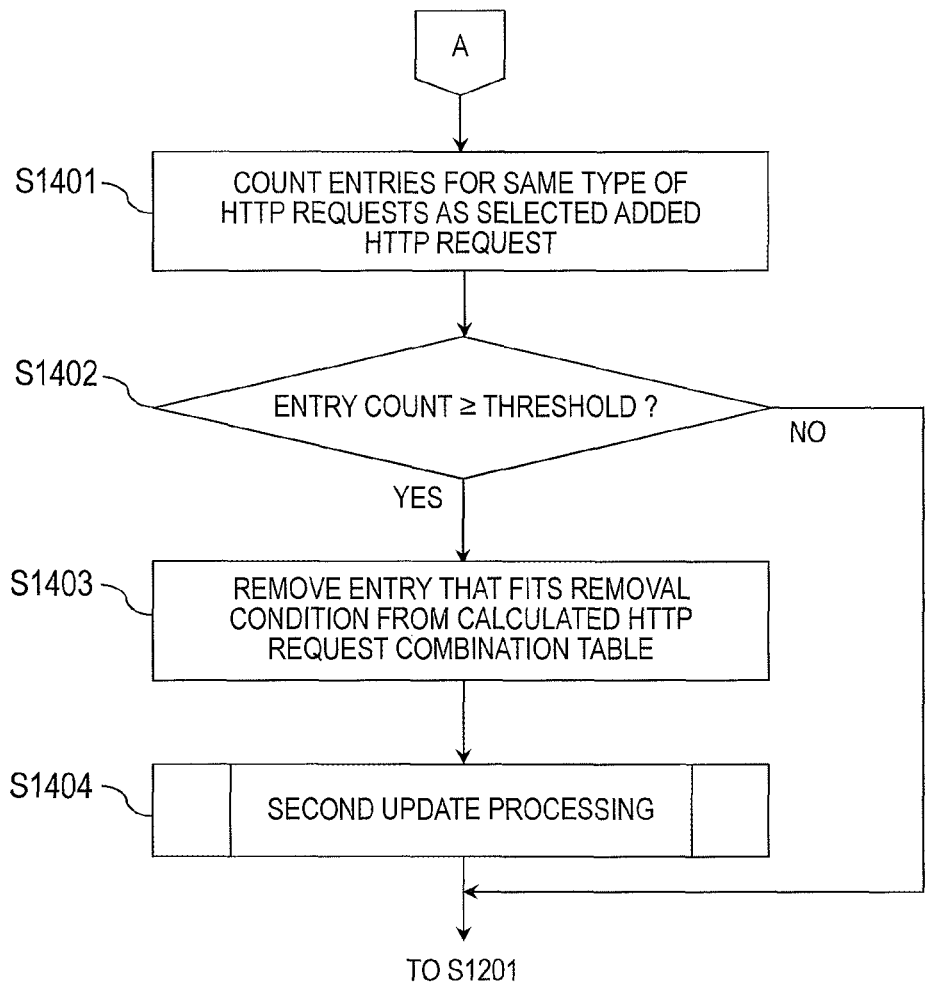
FIG. 14 is a flow chart (the latter half) illustrating an example of the detailed processing steps of the HTTP-SQL compilation table updating processing (Step S1204) of FIG. 12.

FIG. 14 is a flow chart (the latter half) illustrating an example of the detailed processing steps of the HTTP-SQL compilation table updating processing (Step S1204) of FIG. 12. After the first update processing (Step S1310) of FIG. 13, the SQL statement identifying program 82 repeats Step S1301 of FIG. 13 in FIG. 14 by counting entries of the calculated HTTP request combination table 50 that hold the same type as that of the selected added HTTP request as the processing-host-by-processing-host-basis simultaneously executed HTTP request count (Step S1401). Because of the entry addition Step S1309, the processing-host-by-processing-host-basis simultaneously executed. HTTP request count that is obtained in this step is more up to date than the count of Step S1301.

The SQL statement identifying program 82 determines whether or not the processing-host-by-processing-host-basis simultaneously executed HTTP request count, which is the entry count obtained by counting, is equal to or more than a threshold (Step S1402). This threshold is the same as the one in Step S1302. Step S1402 is for determining whether or not the addition of an entry (entries) to the calculated HTTP request combination table 50 in Step S1309 has yielded, a sufficient count of entries (processing-host-by-processing-host-basis simultaneously executed HTTP request count). In the case where a sufficient count of entries has been obtained, that is, when the processing-host-by-processing-host-basis simultaneously executed HTTP request count is equal to or more than the threshold (Step S1402: Yes), the SQL statement identifying program 82 executes Steps S1403 and S1404 to remove excess entries.

In the case where the processing-host-by-processing-host-basis simultaneously executed HTTP request count is less than the threshold (Step S1402: No), on the other hand, the SQL statement identifying program 82 ends the HTTP-SQL compilation table updating processing (Step S1204) for the selected added HTTP request, and returns to Step S1201 of FIG. 12. An unselected added HTTP request is selected and the HTTP-SQL compilation table updating processing (Step S1204) is executed for the added HTTP request in this manner.

In Step S1403, the SQL statement identifying program 82 removes an entry that fits a removal condition from the calculated HTTP request combination table 50 in accordance with "Method 1: select periods that have few disturbance HTTP requests" (Step S1403). For example, in the case where the selected added HTTP request is an HTTP request recorded in the entry 28e of FIG. 3, the HTTP request type identifier 24 is "H1" and an entry that fits a removal condition among the entries 55a to 55e where the HTTP request type identifier 51 is "H1" is removed from the calculated HTTP request combination table 50.

The removal condition is, for example, that the processing-host-by-processing-host-basis simultaneously executed HTTP request count 53 is equal to or more than a threshold. The count of HTTP requests used is controlled and the calculation load can accordingly be reduced in this manner. Alternatively, the removal condition may be that, in addition to the count 53 being equal to or more than the threshold, the processing start time (or end time) is a point, that precedes the current time by a given length of time. In this way, older HTTP requests are excluded from the calculation and the precision of failure cause identification can be improved.

Instead of removing old entries as described above, the removal condition may be that the processing period is equal to or less than a threshold. This is because correlations with more SQL statements are likely to be obtained when the processing period is longer.

Thereafter, the SQL statement identifying program 82 executes second update processing (Step S1404). In the second update processing (Step S1404), the SQL statement identifying program 82 executes an update in which an addition that has been made by the entry removed in Step S1403 is removed from the HTTP-SQL compilation table 60. Details of the second update processing (Step S1404) are described later with reference to FIG. 16.

After the second update processing (Step S1404), the SQL statement identifying program 82 ends the HTTP-SQL compilation table updating processing (Step S1204) for the selected added HTTP request, and returns to Step S1201 of FIG. 12. An unselected added HTTP request is selected and the HTTP-SQL compilation table updating processing (Step S1204) is executed for the added HTTP request in this manner.

Figure 15:
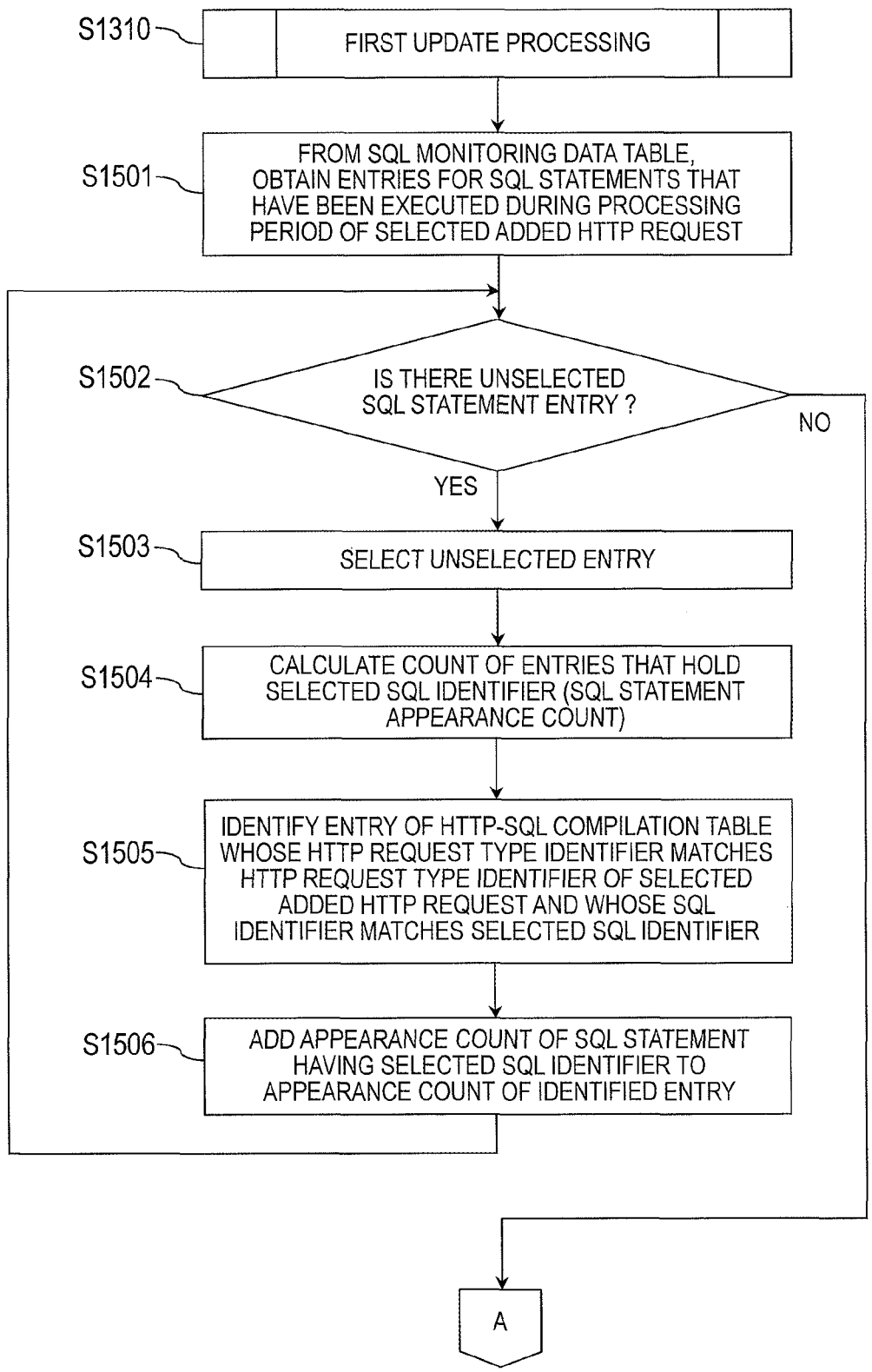
FIG. 15 is a flow chart illustrating an example of detailed processing steps of the first update processing (Step S1310) of FIG. 13.

FIG. 15 is a flow Chart illustrating an example of detailed processing steps of the first update processing (Step S1310) of FIG. 13. The SQL statement identifying program 82 first obtains, from the SQL monitoring data table, entries for SQL statements that have been executed during the processing period of the selected added HTTP request (Step S1501).

To give a concrete example, when the selected added HTTP request is an HTTP request recorded in the entry 28e of FIG. 3, the entries 39e to 39h for SQL statements that have been executed during a processing period in the entry 28e (02:00:00.000 to 02:00:05,000) are obtained from the SQL monitoring data table 30. The processing period of an SQL statement that is regarded as the same as the processing period of a selected added HTTP request may be contained within the processing period of the selected added HTTP request, or may partially overlap with the processing period of the selected, added HTTP request, or may contain the processing period of the selected added HTTP request.

The SQL statement identifying program 82 next determines whether or not there is an unselected entry among the entries obtained in Step S1501 (Step S1502). In the case where there is an unselected entry (Step S1502: Yes), the SQL statement identifying program 82 selects the SQL identifier 31 of the unselected entry (Step S1503).

The SQL statement identifying program 82 calculates how many entries out of the entries obtained in Step S1501 hold the SQL identifier 31 of the selected entry (hereinafter referred to as selected SQL identifier 31) by sorting the obtained entries by their SQL identifier 31 (Step S1504). The entry count calculated in Step S1504 is referred to as "SQL statement appearance count".

The SQL statement identifying program 82 identifies an entry of the HTTP-SQL compilation table 60 where the HTTP request type identifier 61 is the HTTP request type identifier of the selected added HTTP request and the SQL identifier 62 matches the selected SQL identifier 31 (Step S1505).

For example, when the HTTP request type identifier of the selected added HTTP request is "H1" and the selected SQL identifier is "S1", the SQL statement identifying program 82 identifies the entry 64a of the HTTP-SQL compilation table 60. When there is no entry in which the SQL identifier 62 matches the selected SQL identifier 31, the SQL statement identifying program 82 creates a new entry in the HTTP-SQL compilation table 60.

Thereafter, the SQL statement identifying program 82 adds the SQL statement appearance count calculated in Step S1504 to the appearance count 63 of the entry identified in Step S1505 and saves the result (Step S1506). The SQL statement identifying program 82 then returns to Step S1502. When it is determined in Step S1502 that there is no unselected entry (Step S1502: No), the SQL statement identifying program 82 ends the first update processing (Step S1310) and proceeds to Step S1401 of FIG. 14. The appearance count of an SQL statement (SQL statement appearance count) that has been processed during the processing period of a selected added HTTP request is updated as the need arises in this manner.

Figure 16:
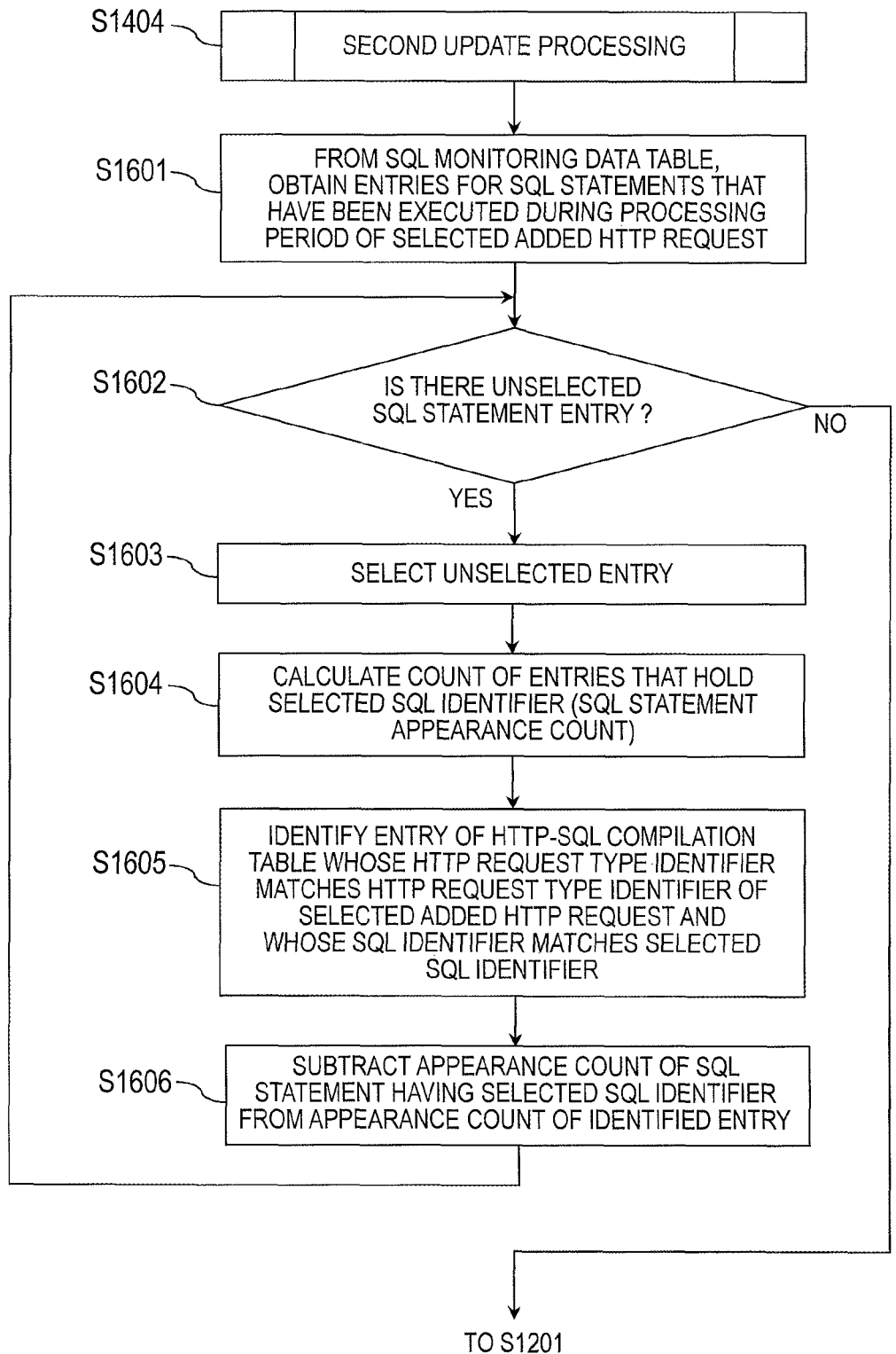
FIG. 16 is a flow chart illustrating an example of detailed processing steps of the second update processing (Step S1404) of FIG. 14.

FIG. 16 is a flow chart illustrating an example of detailed processing steps of the second update processing (Step S1404) of FIG. 14. The Second update processing (Step S1404) is for removing from the HTTP-SQL compilation table 60 an addition that has been made by the entry removed in Step S1403. The second update processing (Step S1404) is processing of subtracting from the SQL statement appearance count in the HTTP-SQL compilation table 60, whereas the first update processing (Step S1310) is for adding to the SQL statement appearance count. Steps S1601 to S1605 are accordingly the same as Steps S1501 to S1505 of FIG. 15, and descriptions thereof are omitted.

In Step S1606, the SQL statement identifying program 82 subtracts the SQL statement appearance count calculated in Step S1604 from the appearance count 63 of the entry identified in Step S1605, and saves the result (Step S1606). The SQL statement identifying program 82 then returns to Step S1602. When there is no unselected entry in Step S1602 (Step S1602: No), the SQL statement identifying program 82 ends the second update processing (Step S1404) and returns to Step S1201 of FIG. 12. An unselected added HTTP request is selected and the HTTP-SQL compilation table updating processing (Step S1204) is executed for the added HTTP request in this manner.

According to the second embodiment, candidates for the causal SQL statement can thus be identified in short time when a delay in the processing of an IMP request occurs by obtaining an association relation between an HTTP request and an SQL statement in advance. This enables the monitoring computer 10 to select periods that have few disturbance HTTP requests in the background, and the calculation amount is consequently reduced. In addition, by diversifying the type of disturbance HTTP requests for each added HTTP request in the background in the manner of Step S1308, adding to the risk of obtaining wrong correlation is avoided, which improves precision in narrowing down SQL statements that are candidates for the cause of a delay in the processing of an HTTP request (a drop in processing performance).

The operation administrator wishing to confirm candidates for the causal SQL statement can confirm the latest candidates at that point by calling up the HTTP-SQL compilation table of FIG. 11B and displaying the table on the screen.

While "Method 1: select periods that have few disturbance HTTP requests" is applied in Step S1403 of FIG. 14 in the second embodiment, Method 1 may be applied before the SQL statement identifying program 82 is activated.

For example, the SQL statement identifying program 82 is activated each time the HTTP monitoring program 80 detects a period that facilitates the identification of an association relation between an HTTP request and an SQL statement, namely, a period which the processing-host-by-processing-host-basis simultaneously executed HTTP request count is equal to or less than the given count described in the above description of Method 1.

Figure 17:
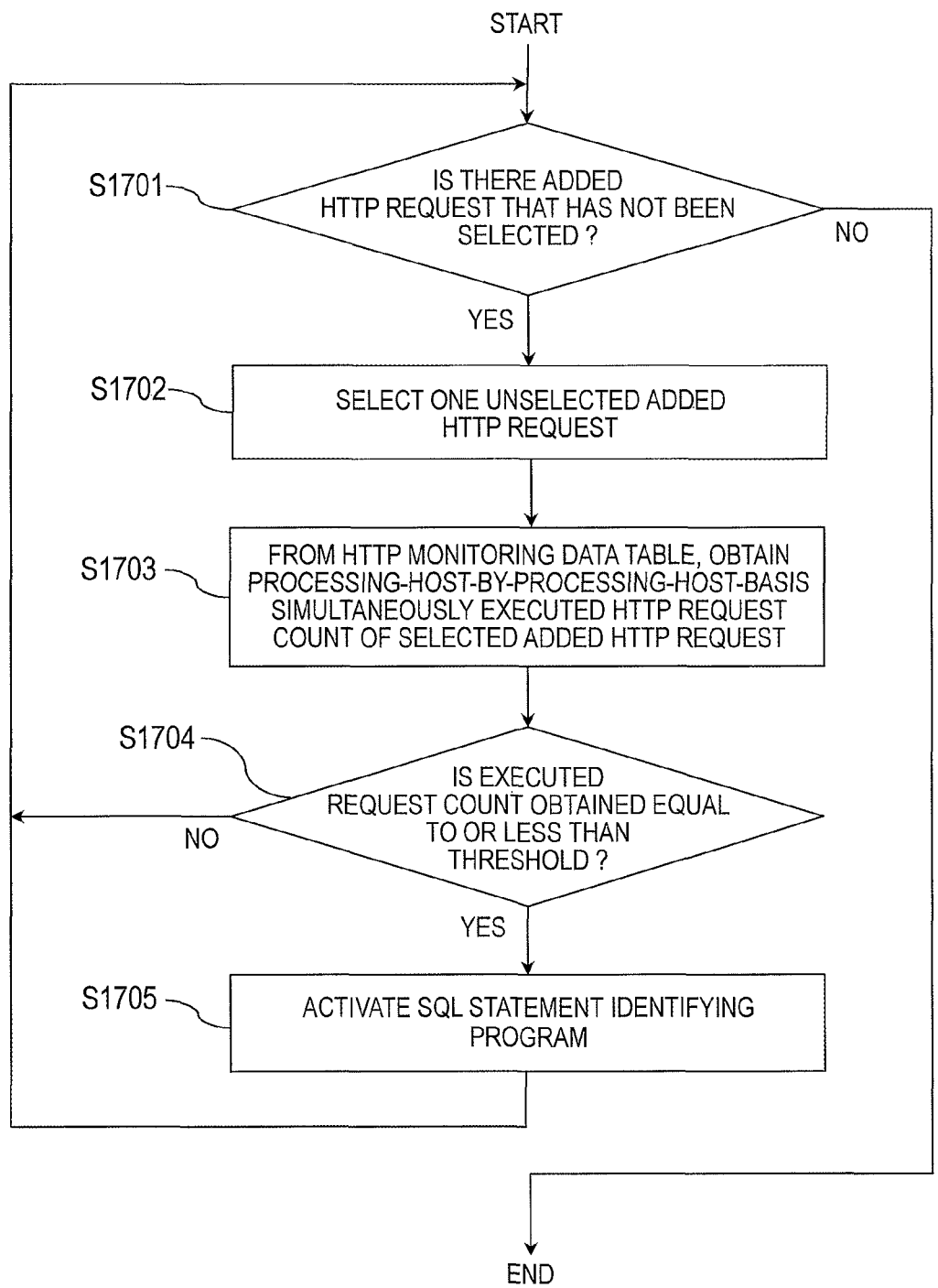
FIG. 17 is a flow chart illustrating an example of detailed processing steps of processing of activating the SQL statement identifying program which is executed by the HTTP monitoring program according to the second embodiment.

FIG. 17 is a flow chart illustrating an example of detailed processing steps of processing of activating the SQL statement identifying program 82 which is executed by the HTTP monitoring program 80 according to the second embodiment. The HTTP monitoring program 80 first determines whether or not there is an added HTTP request that has not been selected (Step S1701), The determination of Step S1701 is made in, for example, cycles shorter than the SQL statement activation cycle described above.

When one or more unselected added HTTP requests are found (Step S1701: Yes), the HTTP monitoring program 80 selects one unselected added HTTP request from the HTTP monitoring data table (Step S1702). The HTTP monitoring program 80 next obtains from the HTTP monitoring data table the processing-host-by-processing-host-basis simultaneously executed HTTP request count of the selected added HTTP request (Step S1703). The HTTP monitoring program 80 then determines whether or not the processing-host-by-processing-host-basis simultaneously executed HTTP request: count obtained in Step S1703 is equal to or less than a threshold (Step S1704).

When the obtained count is equal to or less than the threshold (Step S1705: Yes), the HTTP monitoring program 80 activates the SQL statement identifying program 82 (Step S1705) so that the correlation calculation conforms to "Method 1: select periods that have few disturbance HTTP requests", and returns to Step S1701. In this case, Steps S1203 and S1204 of FIG. 12 are executed for the selected added HTTP request of Step S1702.

When it is determined in Step S1705 that the processing-host-by-processing-host-basis simultaneously executed HTTP request count obtained in Step S1703 is not equal to or less than the threshold (Step S1705: No), on the other hand, the HTTP monitoring program 80 returns to Step S1701. In the case where there is no unselected HTTP request (Step S1701 No), the processing of activating the SQL statement identifying program 82 is ended.

The processing of activating the SQL statement identifying program 82 thus allows for the application of Method 1 prior to the activation of the SQL statement identifying program 82, which improves the efficiency of the processing executed by the SQL statement identifying program 82 to narrow down SQL statements that are candidates for the cause of a delay in the processing of an HTTP request (a drop in processing performance).

In addition, the SQL statement identifying program 82 is activated when the processing-host-by-processing-host-basis simultaneously executed HTTP request count is equal to or less than a threshold, which means that the SQL statement identifying program 82 is activated only when necessary, as opposed to being activated periodically. Unnecessary SQL statement identifying processing is consequently prevented, and the calculation load on the monitoring computer is reduced.

Third Embodiment

A third embodiment of this invention is described next. In the first embodiment and the second embodiment, periods that facilitate the identification of a relation between an HTTP request and an SQL statement are selected from among given monitoring data. The third embodiment is an opposite example in which monitoring data that facilitates the relation Identification is created.

The SQL statement monitoring program 81 in the first embodiment and the second embodiment is allowed to observe only some of SQL statements transmitted to the DB server 94 because the load on the DB server 94 that is incurred by observing all SQL statements with the SQL statement monitoring program 81 is not ignorable. The SQL statement monitoring program 81 in the first embodiment and the second embodiment therefore observes the DB server 94 at regular intervals so a to avoid an excessive load on the DB server 94 from the observation. The measuring of the processing time is limited to SQL statements that are being processed at the time of observation, which means that, while the load on the DB server 94 is light, only limited SQL statements are observed.

In the third embodiment, on the other hand, the method of monitoring the DB server 94 by the SQL statement monitoring program 81 is switched dynamically. An association relation between an HTTP request and an SQL statement is apparent in a period that has few HTTP requests as described above. The SQL statement monitoring program 81 in the third embodiment switches between all-SQL statement observation and partial-SQL statement observation depending on the count of HTTP requests.

Specifically, all SQL statements are observed in a period that is estimated to be low in HTTP request count and in other periods, some of SQL statements are observed as in the first embodiment and the second embodiment. In the third embodiment, components and processing that are the same as the ones in the first embodiment and the second embodiment are denoted by the same reference symbols, and descriptions thereof are omitted.

<System Configuration of the Network System 1>

Figure 18:
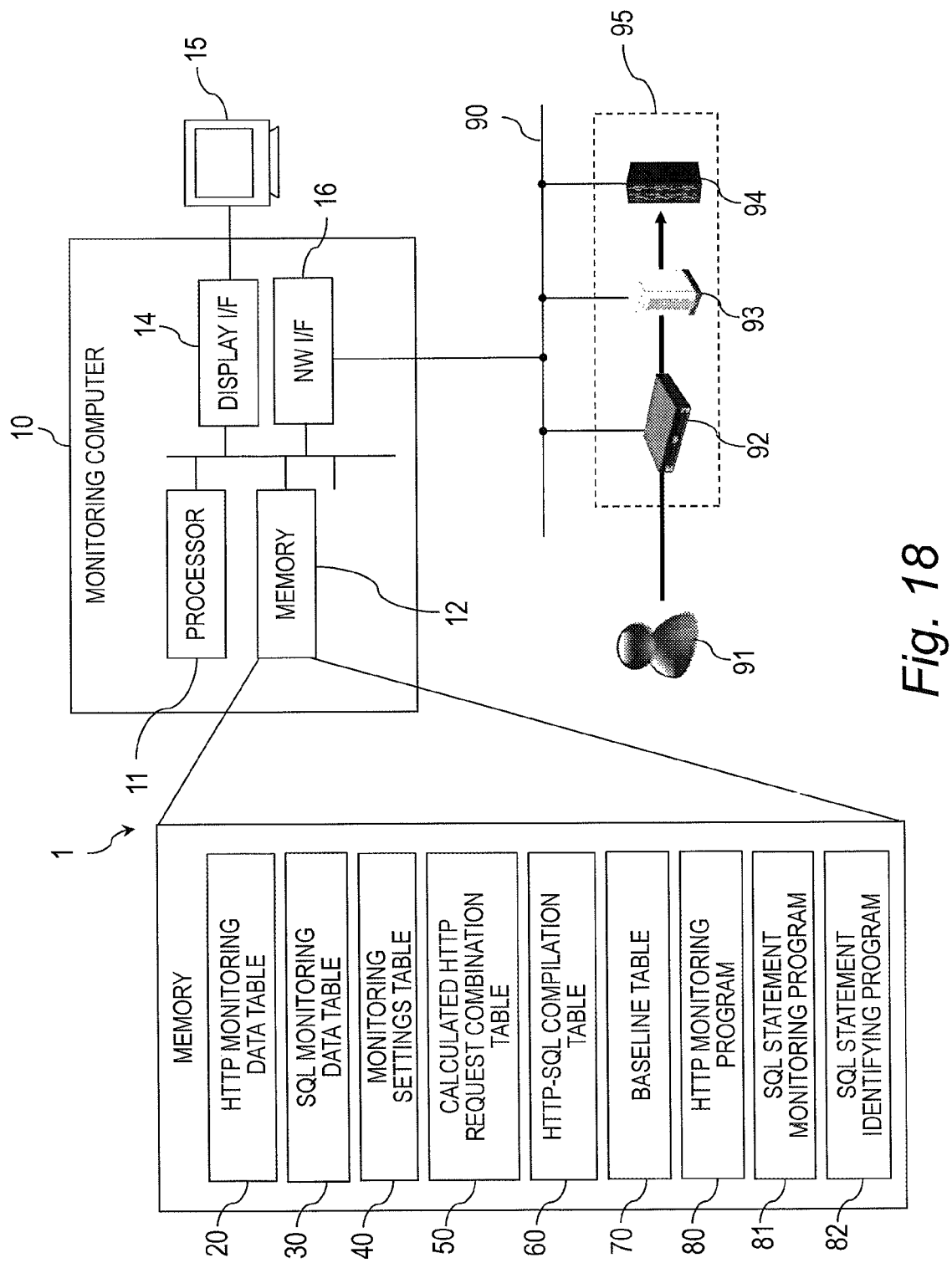
FIG. 18 is a system configuration diagram of the network system according to the third embodiment.

FIG. 18 is a system configuration diagram of the network system 1 according to the third embodiment. The system configuration of FIG. 18 is obtained by adding a baseline table 70 to the system configurations of the first embodiment and the second embodiment.

<Example of Data Stored in the Baseline Table 70>

Figure 19:
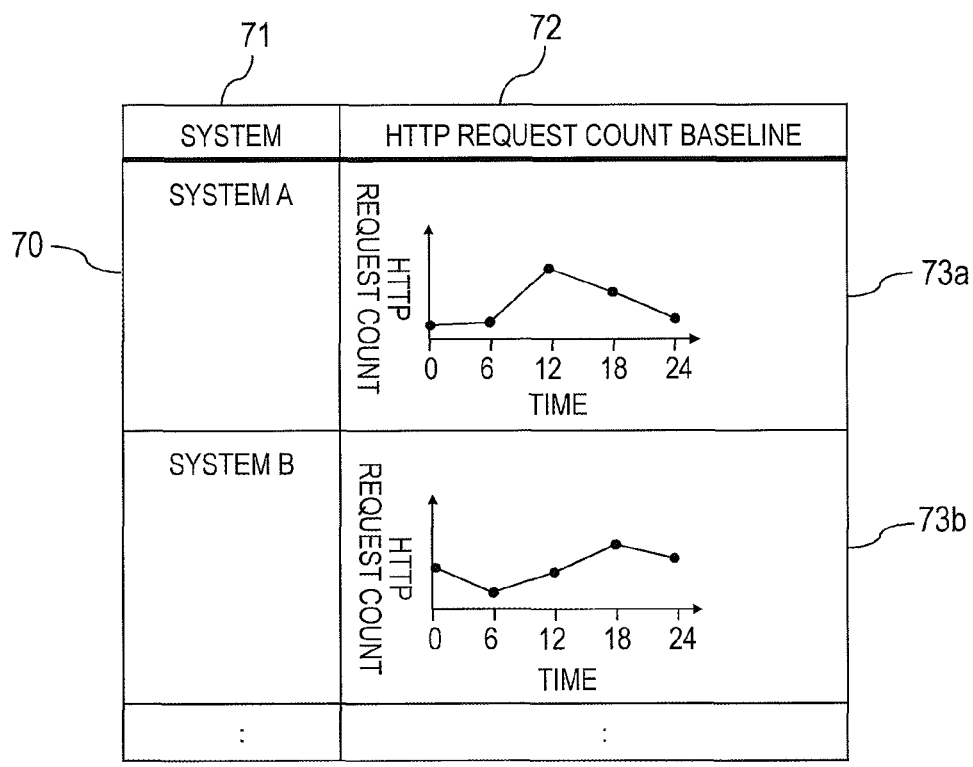
FIG. 19 is an explanatory diagram showing an example of data that is stored in the baseline table of FIG. 18.

FIG. 19 is an explanatory diagram showing an example of data that is stored in the baseline table 70 of FIG. 18. The baseline table 70 is a table for recording the "normal behavior (baseline)" of the computer system 95 which is calculated from records of the HTTP monitoring data table 20. In the baseline table 70, information that indicates the type of the computer system 95 is recorded as a system 71. A baseline for the count of HTTP requests that are usually processed by the computer system 95 is recorded as an HTTP request count baseline 72. The baseline may be created by a common method. Specifically, the monitoring Computer performs statistical processing on past HTTP request counts recorded in the HTTP monitoring data table 20 to calculate and record an average HTTP request count (and a standard deviation thereat) on an hourly basis.

Figure 20:
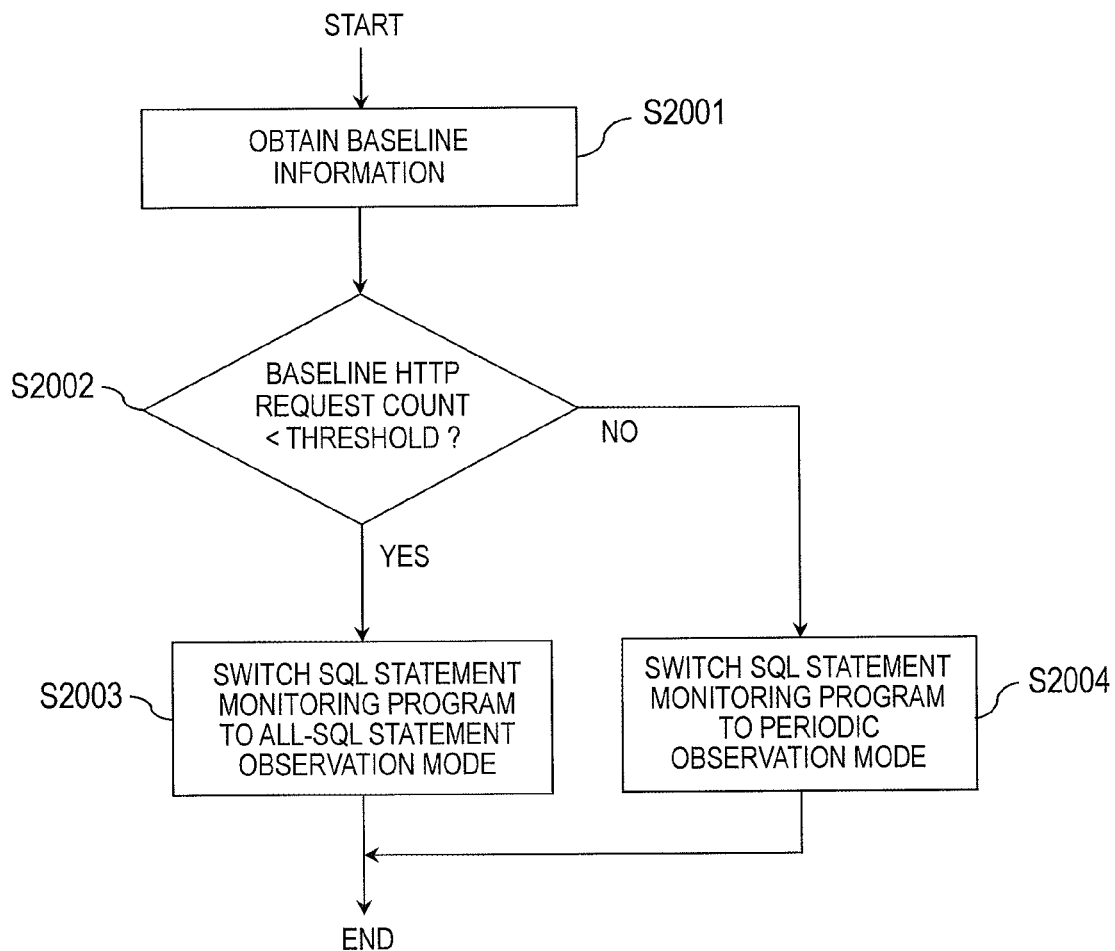
FIG. 20 is a flow chart illustrating an example of detailed processing steps of monitoring mode switching processing which is executed by the SQL statement monitoring program.

FIG. 20 is a flow chart illustrating an example of detailed processing steps of monitoring mode switching processing which is executed by the SQL statement monitoring program 81. The SQL statement monitoring program 81 periodically switches observation modes by following this flow chart. The SQL statement monitoring program 81 first obtains the HTTP request count baseline 72 of the computer system 95 that is a monitoring subject from the baseline table 70 (Step S2001).

The SQL statement monitoring program 81 next identifies the HTTP request count at the current time for the HTTP request count baseline 72 obtained in Step S2001, and compares the identified HTTP request count with a threshold (Step S2002). When the identified count is less than the threshold (Step S2002: Yes), the SQL statement monitoring program 81 switches the observation mode of the SQL statement monitoring program 81 to an all-SQL statement observation mode (Step S2003), and ends the processing. The all-SQL statement observation mode is a mode in which the SQL statement monitoring program 81 observes all SQL statements and in the case of a packet capture method, for example, all captured packets are observed.

When it is determined in Step S2002 that the identified count is equal to or more than the threshold (Step S2002: No), on the other hand, the SQL statement monitoring program 81 switches the observation mode of the SQL statement monitoring program 81 to a periodic observation mode (Step S2004), and ends the processing. The periodic observation mode is a mode in which the SQL statement monitoring program 81 observes SQL statements at given time intervals such as 1-second intervals. Thinned out SQL statements are observed in this mode as opposed to the all-SQL statement observation mode. SQL statement monitoring processing depending on calculation load can be executed in this manner.

The SQL statement monitoring program 81 thus switches the observation mode based on the past history (baseline). Normally, the all-SQL statement observation mode in which the load on the DB server 94 is tolerated to some degree is executed in a period that has few HTTP requests, and the periodic observation mode in which the load on the DB server 94 is light is executed in other periods. In this way, many SQL statements are obtained in periods low in HTTP request count which are periods that facilitate the identification of an association relation between an HTTP request and an SQL statement, and the association relation identification is made efficient.

While the third embodiment discusses an example of switching between the all-SQL statement observation mode and the periodic observation mode, the cycle in Step S2003 may be shorter than the observation cycle in the periodic observation mode of Step S2004. In Step S2002 where the HTTP request count is compared with a threshold, a plurality of thresholds may be prepared so that the observation cycle of the observation mode is changed in stages depending on which threshold is used.

As described above, according to the embodiment mode of this invention, the calculation amount is reduced by selecting periods that have few disturbance HTTP requests, and precision in narrowing down SQL statements that are candidates for the cause of a delay in the processing of an HTTP request (a drop in processing performance) is improved by diversifying the type of disturbance HTTP requests.

While the embodiment mode described above is about a pairing of an HTTP request and an SQL statement, this invention is not limited to the HTTP request-SQL statement pairing. For instance, this invention may be applied to electronic mail instead of HTTP requests. In short, this invention is applicable to cases where data flows are observed by two different independent methods. Similarly, the configuration of the computer system 95 which is a monitoring subject is not limited to the configuration of FIG. 2, FIG. 10, and FIG. 18.

When Method 2 is applied in the first embodiment, the monitoring computer 10 is configured to store a first request group, which is a group of first requests received by a first apparatus, and a second request group, which is a group of second requests processed by a second apparatus in response to a request from the first apparatus; obtain, from the first request group, same-type requests which are of the same type as an investigation subject request in the first request group; obtain, for the investigation subject request and each of the same-type requests, from among other-type requests in the first request group which are of different types from the investigation subject request, other-type requests that have been transmitted from the first apparatus to the second apparatus and a response to which has been transmitted from the second apparatus to the first apparatus during a processing period of one of the investigation subject request and the each of the same-type requests which starts with the transmission of the One of the investigation subject request and the each of the same-type requests from the first apparatus to the second apparatus and ends with the transmission of a response to the one of the investigation subject request and the each of the same-type requests from the second apparatus to the first apparatus; generate, for the investigation subject request and each of the same-type requests, sets in which one of the investigation subject request and the each of the same-type requests is combined with the obtained other-type requests; search the generated sets for sets that have the matching other-type requests, and remove one of the found sets; obtain, for the investigation subject request and each of the same-type requests after the removal, the second requests that have been processed by the second apparatus during the processing period from the second request group; calculate, for the investigation subject request and each of the same-type requests after the removal, values of correlation with the obtained second requests; and output the result of the calculation.

When Method 1 is applied in the first embodiment, the monitoring computer 10 is configured to store a first request group, which is a group of fast requests received by a first apparatus, and a second request group, which is a group of second requests processed by a second apparatus in response to a request from the first apparatus; obtain, from the first request group, same-type requests which are of the same type as an investigation subject request in the first request group; obtain, for the investigation subject request and each of the same-type requests, from among other-type requests in the first request group which are of different types from the investigation subject request, other-type requests that have been transmitted from the first apparatus to the second apparatus and a response to which has been transmitted from the second apparatus to the first apparatus during a processing period of one of the investigation subject request and the each of the same-type requests which starts with the transmission of the One of the investigation subject request and the each of the same-type requests from the first apparatus to the second apparatus and ends with the transmission of a response to the one of the investigation subject request and the each of the same-type requests from the second apparatus to the first apparatus; remove, from the investigation subject request and the same-type requests, one of a request which has a given count or higher of the obtained other-type requests and a request is in a given place or lower in ascending order; obtain, for the investigation subject request and each of the same-type requests after the removal, the second requests that have been processed, by the second apparatus during the processing period from the second request group; calculate, for the investigation subject request and each of the same-type requests after the removal, values of correlation with the obtained second requests; and output the result of the calculation.

When Method 2 is applied in the second embodiment, the monitoring computer 10 is configured to store a first request group, which is a group of first requests received by a first apparatus, a second request group, which is a group of second requests processed by a second apparatus in response to a request from the first apparatus, association information which holds, for each first request in the first request group, association between the each first request and same-type requests which ere of the same type as the each first request, and count information, which holds, for each first request in the first request group and each second request in the second request group, association between the each first request, the each second request, and an appearance count of the each second request; select, from the first request group, a first, addition subject request which has not been added to the association information; obtain, from among other-type requests in the first request group and pieces of the association information which are of different types from the selected first addition subject request, other-type requests that have been transmitted from the first apparatus to the second apparatus and a response to which has been transmitted from the second apparatus to the first apparatus during a processing period of the selected first addition subject request which starts with the transmission of the selected first addition subject request from the first apparatus to the second apparatus and ends with the transmission of a response to the selected first addition subject request from the second apparatus to the first apparatus; determine whether or not there is an overlap between the other-type requests obtained from the first request group and the other-type requests obtained from the association information; add, when there is no overlap, the first addition subject request and the other-type requests obtained from the first request group to the association information; identity, from among the second request group, a second addition subject request which has been processed by the second apparatus during the processing period of the first addition subject request, and an appearance count of the second addition subject request; and update the count information based on the first addition subject request, the second addition subject request, and the appearance count of the second addition subject request.

When Method 1 is applied in the second embodiment, the monitoring computer 10 is configured to store a first request group, which is a group of first requests received by a first apparatus, a second request group, which is a group of second requests processed by a second apparatus in response to a request from the first apparatus, association information, which holds, for each first request in the first request group, association between the each first request and same-type requests which are of the same type as the each first request, count information, which holds, for each first request in the first request group and each second request in the second request group, association between the each first request the each second request, and an appearance count of the each second request; select, from the first request group, a first addition subject request which has not been added to the association information; obtain, from among other-type requests in the first request group which are of different types from the first addition subject request, other-type requests that have been transmitted from the first apparatus to the second apparatus and a response to which has been transmitted from the second apparatus to the first apparatus during a processing period of the selected first addition subject request which starts with the transmission of the selected first addition subject request from the first apparatus to the second apparatus and ends with the transmission of a response to the selected first addition subject request from the second apparatus to the first apparatus; add the first addition subject request and the other-type requests identified from the first request group to the association information; identify, from among the second request group, a second addition subject request which has been processed by the second apparatus during the processing period of the first addition subject request, and an appearance count of the second addition subject request; update the count information based on the first addition subject request, the second addition subject request, and the appearance count of the second addition subject request; count other-type it in the association information that are of different types from the first addition subject request added to the association information; remove, when a result of the counting is equal to or more than a given count, the first addition subject request added to the association information and the other-type requests identified from among the first request group from the association information and update the count information by subtracting the appearance count from the count information.

It should be noted that this invention is not limited to the above-mentioned embodiments, and encompasses various modification examples and the equivalent configurations within the scope of the appended claims without departing from the gist of this invention.

What is claimed is:

1. An identification apparatus, comprising:
a memory; and
an interface communicatively coupled to a first apparatus and a second apparatus;
a processor communicatively coupled to the memory and the interface,
wherein the memory stores a first request group, which is a group of first requests received by the first apparatus, and a second request group, which is a group of second requests processed by the second apparatus in response to a request from the first apparatus, and
wherein the processor
stores, in the memory, association information and count information for the first request group and the second request group;
selects, from the first request group, a first addition subject request which has not been added to the association information;
obtains, from the first request group, a plurality of same-type requests which are of the same type as an investigation subject request in the first request group;
obtains from the first request group a plurality of other-type requests that have been transmitted from the first apparatus to the second apparatus and are of different types compared to the investigation subject request during a processing period of the investigation subject request and the each of the plurality of same-type requests; wherein the processing period starts with a transmission of the investigation subject request and the plurality of same-type requests from the first apparatus to the second apparatus and ends with a transmission of a response to the investigation subject request and the plurality of same-type requests from the second apparatus to the first apparatus;
identifies, from among the second request group, a second addition subject request that has been processed by the second apparatus during the processing period, and an appearance count of the second addition subject request;
updates a count based on the first addition subject request, the second addition subject request, and the appearance count;
generates second appearance count information, when there is no overlap, by counting any of the plurality of other-type requests in the association information that are different types of requests compared to the first addition subject request added to the association information;
removes, when the second appearance count is equal to or more than a given count, a third appearance count, wherein the third appearance count is equal to the first addition subject request added to the association information and the plurality of other-type requests identified from among the first request group from the association information;
updates the count information by subtracting the third appearance count from the count information;
determines whether or not a first count of a plurality of other-type requests stored among the first request group is greater than a second count of a plurality of other-type requests stored in the association information;
determines, when the first count is greater than the second count, whether or not there is an overlap between any of the plurality of other type requests that exist in the first request group and any of the plurality of other type requests that exist in the association information;
calculates, when there is no overlap, values of correlation with the first addition subject request and the second request group of a same processing period to generate a result; and
outputs the result by displaying, via the identification apparatus, a rating associated with the correlation.

2. The identification apparatus according to claim 1, wherein the processor further:
removes, from the plurality of same-type requests a number of same type requests from the first group of requests that sum up to a given count or higher or are in a given place or lower in ascending order.

3. The identification apparatus according to claim 1, is further configured to remove, from among the second requests that have been processed by the second apparatus during the processing period, all requests from the first group of requests whose processing started before reception of any of the plurality of same-type requests by the first apparatus.

4. The identification apparatus according to claim 1, is further configured to remove, from among the second requests that have been processed by the second apparatus during the processing period, all requests whose processing period has a length that is less than a given length.

5. The identification apparatus according to claim 1, wherein the investigation subject request is manually input.

6. The identification apparatus according to claim 1,
wherein the memory stores prediction information that indicates predicted fluctuations with time in load on the second apparatus in relation to a request count of the first request group, and
wherein the processor is configured to:
identify a predicted load fluctuation at a current time from the prediction information; and
change an interval of processing that is executed by the second apparatus to an interval based on the identified predicted load fluctuation.

7. A non-transitory computer readable storage medium storing instructions to be executed by a processor of an identification apparatus, that is coupled to a first apparatus and a second apparatus,
wherein the instructions cause the processor to:
store in a memory of the identification apparatus a first request group, a second request group, association information, and count information for the first request group, the second request group, and the association information,
wherein the first request group is a plurality of first requests received by the first apparatus comprising a plurality of other-type requests and a plurality of same-type requests,
wherein the second request group is a plurality of second requests processed by the second apparatus in response to a request from the first apparatus,
wherein the plurality of same-type requests are the same type of requests as the plurality of first requests,
wherein the association information comprises associations between the first request group and a plurality of same-type requests,
select, from the first request group, a first addition subject request which has not been added to the association information;
obtain, a plurality of other-type requests from a processing period that are requests of a different type compared to the first addition subject request, wherein the processing period starts with a transmission of the first addition selected subject request from the first apparatus to the second apparatus and ends with a transmission of a response to the first addition selected subject request from the second apparatus to the first apparatus;

identify, from among the second request group, a second addition subject request that has been processed by the second apparatus during the processing period, and an appearance count of the second addition subject request;

update a count based on the first addition subject request, the second addition subject request, and the appearance count;

generate second appearance count information, when there is no overlap, by counting any of the plurality of other-type requests in the association information that are different types of requests compared to the first addition subject request added to the association information;

remove, when the second appearance count is equal to or more than a given count, a third appearance count, wherein the third appearance count is equal to the first addition subject request added to the association information and the plurality of other-type requests identified from among the first request group from the association information;

update the count information by subtracting the third appearance count from the count information;

determine whether or not a first count of a plurality of other-type requests stored among the first request group is greater than a second count of a plurality of other-type requests stored in the association information;

determine, when the first count is greater than the second count, whether or not there is an overlap between any of the plurality of other type requests that exist in the first request group and any of the plurality of other type requests that exist in the association information;

calculate, when there is no overlap, values of correlation with the first addition subject request and the second request group of a same processing period to generate a result; and output the result by displaying, via the identification apparatus, a rating associated with the correlation.

* * * * *